(12) United States Patent
Hayashi et al.

(10) Patent No.: US 11,998,990 B2
(45) Date of Patent: Jun. 4, 2024

(54) MACHINE TOOL, MACHINING METHOD USING A MACHINE TOOL, AND MACHINING PROGRAM FOR MACHINE TOOL

(71) Applicant: Yamazaki Mazak Corporation, Niwa-gun (JP)

(72) Inventors: Kentaro Hayashi, Niwa-gun (JP); Yasuharu Sumida, Niwa-gun (JP); Morikuni Kimura, Niwa-gun (JP); Masato Yoshida, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 833 days.

(21) Appl. No.: 17/110,286

(22) Filed: Dec. 3, 2020

(65) Prior Publication Data

US 2021/0086267 A1 Mar. 25, 2021

Related U.S. Application Data

(63) Continuation of application No. PCT/JP2018/033224, filed on Sep. 7, 2018.

(51) Int. Cl.
*B23B 1/00* (2006.01)
*B23B 23/00* (2006.01)
*B23Q 15/12* (2006.01)

(52) U.S. Cl.
CPC .............. *B23B 1/00* (2013.01); *B23B 23/00* (2013.01); *B23Q 15/12* (2013.01)

(58) Field of Classification Search
CPC ........... B23B 1/00; B23B 23/00; B23B 3/065; B23Q 15/12; G05B 2219/35433; G05B 19/409; Y02P 90/02
See application file for complete search history.

(56) References Cited

U.S. PATENT DOCUMENTS 4,417,489 A 11/1983 Liu
4,646,422 A 3/1987 McMurtry
(Continued)

FOREIGN PATENT DOCUMENTS

CN 1797251 7/2006
CN 1975815 6/2007
(Continued)

OTHER PUBLICATIONS

Office Action for corresponding EP Application No. 18932962.6-1017, dated Dec. 22, 2021.
(Continued)

*Primary Examiner* — Gary Collins
(74) *Attorney, Agent, or Firm* — MORI & WARD, LLP

(57) ABSTRACT

A machine tool includes a workpiece spindle being rotatable about a rotation axis of the workpiece and configured to hold a workpiece such that the workpiece. A tool holding device is rotatable about a tool rotation axis and configured to hold a turning tool via which turning is performed on the workpiece. A movement mechanism is configured to move the tool holding device such that the turning tool rotates relatively to the workpiece toward an arbitrary direction perpendicular to the rotation axis of the workpiece. Control circuitry is configured to execute a machining program, to perform the turning, which includes an additional code which designates a target cutting direction of the arbitrary cutting direction, and to control the movement mechanism to move the turning tool in the target cutting direction with respect to the workpiece while the control circuitry executes the additional code.

20 Claims, 24 Drawing Sheets

(56) References Cited

U.S. PATENT DOCUMENTS

| | | | |
|---|---|---|---|
| 2006/0142892 A1 | 6/2006 | Ohashi et al. | |
| 2006/0283292 A1 | 12/2006 | Iwabuchi et al. | |
| 2007/0144316 A1 | 6/2007 | Muraki et al. | |
| 2008/0019782 A1 | 1/2008 | Imai et al. | |
| 2008/0121078 A1 | 5/2008 | Kunimatsu et al. | |
| 2010/0005936 A1 | 1/2010 | Yoshino | |
| 2010/0101383 A1 | 4/2010 | Ito et al. | |
| 2014/0216218 A1* | 8/2014 | Yoshino | B23Q 1/623 82/158 |
| 2015/0168938 A1 | 6/2015 | Fujimoto et al. | |

FOREIGN PATENT DOCUMENTS

| | | |
|---|---|---|
| CN | 101489705 | 7/2009 |
| CN | 101670444 | 3/2010 |
| CN | 101722315 | 6/2010 |
| EP | 0088646 | 9/1983 |
| EP | 3196721 | 7/2017 |
| JP | 8-155789 | 6/1996 |
| JP | 2010-17801 | 1/2010 |
| JP | 2017-127960 | 7/2017 |
| WO | WO 2016/148116 | 9/2016 |

OTHER PUBLICATIONS

Office Action for corresponding EP Application No. 18932962.6-1017, dated May 14, 2021.

Chinese Office Action for corresponding CN Application No. 201880095038.8, dated Jan. 28, 2023 (w/ machine translation).

Chinese Office Action for corresponding CN Application No. 201880095038.8, dated Aug. 10, 2023 (w/ machine translation).

Zhou Daxun, "Introduction to Mechanical Manufacturing", pp. 163-164, Higher Education Press, Beijing, China, Dec. 31, 1998 (w/ machine translation).

Supplementary European Search Report for corresponding EP Application No. 18932962.6-1017, dated Mar. 25, 2021.

The International Preliminary Report on Patentability (Chapter I) with translation of Written Opinion for corresponding International Application No. PCT/JP 2018/033224, dated Mar. 18, 2021.

International Search Report for corresponding International Application No. PCT/JP2018/033224, dated Dec. 4, 2018.

Written Opinion for corresponding International Application No. PCT/JP2018/033224, dated Dec. 4, 2018.

Japanese Office Action for corresponding JP Application No. 2020-008327, dated Oct. 7, 2020 (w/ English machine translation).

* cited by examiner

FIG. 1
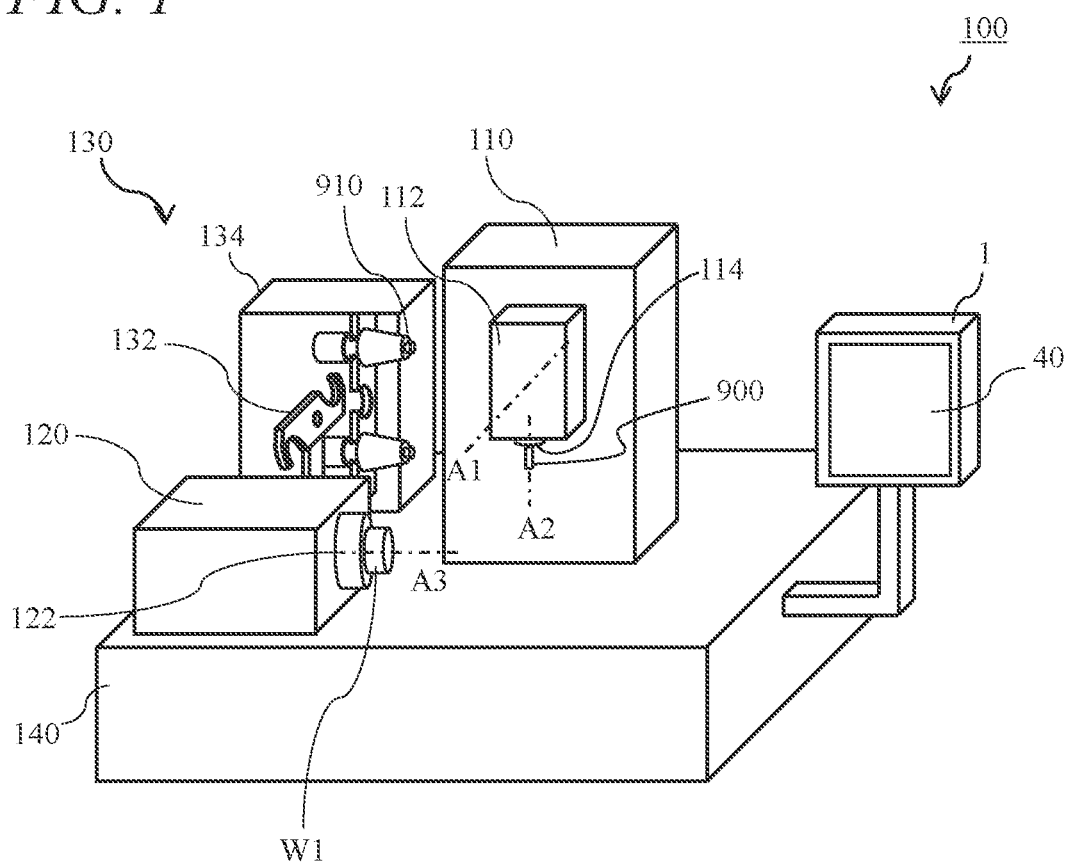
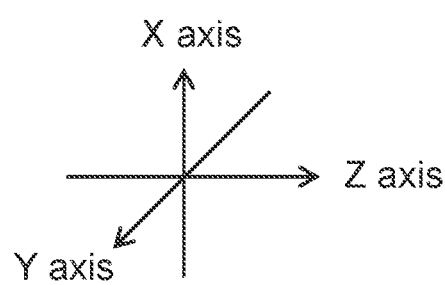

FIG. 4A
| | X | Y | Z |
|---|---|---|---|
| Workpiece spindle position | 0 | 0 | 0 |
| Tool spindle position | Tx | Ty | Tz |
FIG. 4B
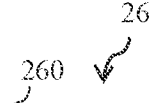
| | Outer diameter | Inner diameter | Height |
|---|---|---|---|
| Workpiece W1 | 200 | 100 | 50 |
| Workpiece W2 | 150 | – | 100 |
| | Extension portion length | Nose position | Blade length | Blade direction |
|---|---|---|---|---|
| First turning tool | 120 | (100, 10, 8) | 5 | Orthogonal |
| Second turning tool | 80 | (70, 6, 4) | 3 | Orthogonal |
| Third turning tool | 80 | (70, 6, 4) | 5 | Parallel |

R. angle: Rotational angle   C. depth: Cutting depth
F. distance: Feeding distance

*FIG. 9*

|     | X   | Y   | Z   |
| --- | --- | --- | --- |
| IP  | Ix  | Iy  | Iz  |
| OSP | CSx | 0   | CSz |
| OEP | CEx | 0   | CEz |
| NP  | Nx  | Ny  | Nz  |
| CP  | Ex  | Ey  | Ez  |

IP: Initial position   OSP: Turning start position
OEP: Turning end position   NP: Nose position
CP: No-blade corner position R. angle: Rotational angle   C. depth: Cutting depth
F. distance: Feeding distance R. angle: Rotational angle   C. depth: Cutting depth
F. distance: Feeding distance

FIG. 20

| Machining content | Machining conditions ||| Rotational angle | Chatter vibration acceleration |
|---|---|---|---|---|---|
| | Tool | Cutting depth | F. distance | | |
| ID turning | First TT | 5 | 10 | 30 | 80 |
| ID turning | Second TT | 10 | 20 | 90 | 58 |
| ID turning | Second TT | 15 | 40 | 180 | 90 |
| ID turning | Second TT | 5 | 20 | 15 | 40 |
| ID turning | First TT | 10 | 10 | 135 | 60 |

F. distance: Feeding distance   ID turning: Inner diameter turning
First TT: First turning tool   Second TT: Second turning tool FIG. 22
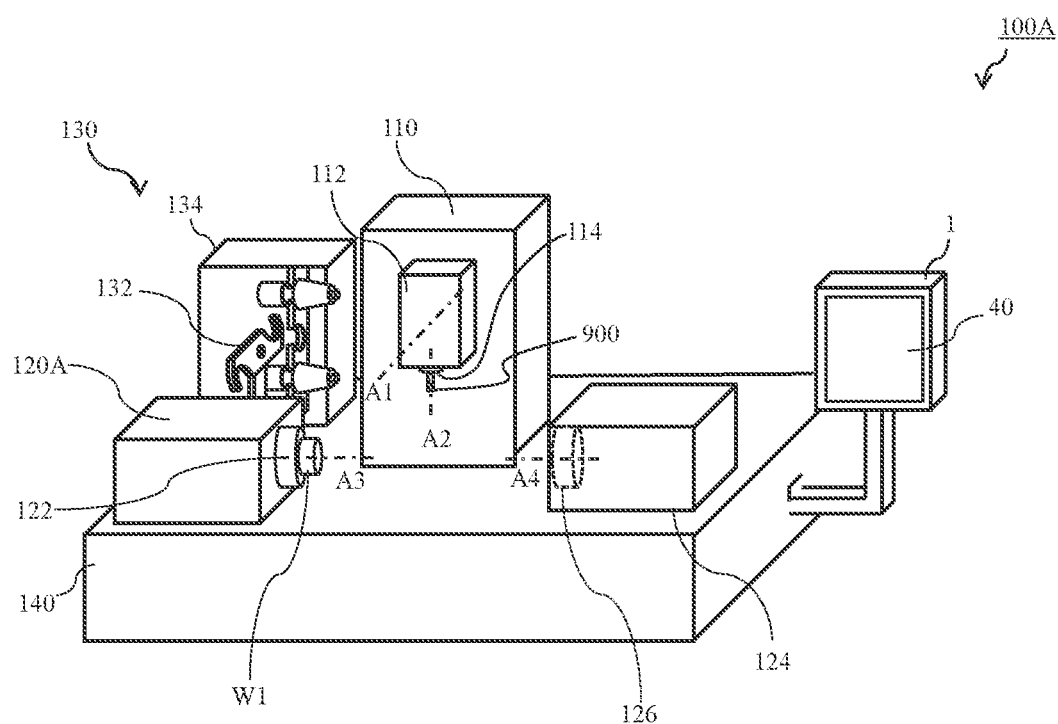
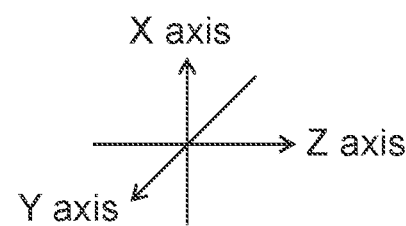

G96S130
G10.9X1
:
<Inner diameter turning 1>
:
G10.9X0

G40

G91G28X0.Y0.
G91G28Z0.
T2M6
G90G53B0.
M19S45
G92S1200R1
G54G95
G43
G18
G68X0Y0Z0I0J0K1R-45.
G96S130
G10.9X1
:
<Inner diameter turning 2>
:
G10.9X0
G97
G40
G69
```

22B

```
G91G28X0.Y0.
G91G28Z0.
:
<Forward workpiece>
:
T3M6
G90G53B180.
M19S225
G92S1200R1
G54G95
G43
G18
G68X0Y0Z0I0J0K1R-45.
G96S130
G10.9X1
:
<Inner diameter turning 3>
:
G10.9X0
G97
G40
G69
G91G28X0.Y0.
G91G28Z0.
M30
```

MACHINE TOOL, MACHINING METHOD USING A MACHINE TOOL, AND MACHINING PROGRAM FOR MACHINE TOOL

CROSS-REFERENCE TO RELATED APPLICATIONS

The present application is a continuation application of International Application No. PCT/JP2018/033224, filed Sep. 7, 2018. The contents of this application are incorporated herein by reference in their entirety.

BACKGROUND OF THE INVENTION

Field of the Invention

The present invention is related to a machine tool, a machining method using a machine tool, and a machining program for a machine tool.

Discussion of the Background

JP 2010-017801A discloses a turning device that performs turning with respect to a workpiece rotating about a rotation axis and that changes a cutting direction, which is equivalent to a radial direction of the rotation axis.

SUMMARY OF THE INVENTION

According to one aspect of the present invention, a machine tool includes a workpiece spindle, a tool holding device, a movement mechanism, and control circuitry. The workpiece spindle is rotatable about a rotation axis of the workpiece and configured to hold a workpiece to rotate the workpiece about the rotation axis. The tool holding device is rotatable about a tool rotation axis and configured to hold a turning tool via which turning is performed on the workpiece. The movement mechanism is configured to move the tool holding device such that the turning tool rotates relatively to the workpiece toward an arbitrary cutting direction perpendicular to the rotation axis of the workpiece. The control circuitry is configured to execute a machining program, to perform the turning, which includes an additional code which designates a target cutting direction of the arbitrary cutting direction. The control circuitry is configured to control the movement mechanism to move the turning tool in the target cutting direction with respect to the workpiece while the control circuitry executes the additional code.

According to another aspect of the present invention, a machining method for a machine tool includes mounting a workpiece to a workpiece spindle that is rotatable about a rotation axis of the workpiece. A turning tool to cut the workpiece by turning is installed in a tool holding device, the tool holding device being mounted on a movement mechanism configured to move the tool holding device with respect to the workpiece toward an arbitrary cutting direction perpendicular to the rotation axis of the work piece. A machining program which includes an additional code which designates a target cutting direction of the arbitrary cutting direction is executed to perform turning. The movement mechanism is controlled to move the turning tool in the target cutting direction with respect to the workpiece while the additional code is executed.

According to further aspect of the present invention, a non-transitory computer-readable storage medium storing a machining program for causing a processor to perform a control method for a machine tool. The control method includes controlling a movement mechanism of the machine tool to move a turning tool of the machine tool with respect to a workpiece in a cutting direction in a three-dimensional coordinate system defined in the machining program, the cutting direction being identical to a basic cutting direction, and changing the cutting direction from the basic cutting direction to a target cutting direction based on a target angle made by the basic cutting direction and the target cutting direction, the target angle being specified in an additional code in the machining program.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings.

FIG. 1 illustrates a schematic configuration of a machine tool according to a first embodiment.

FIG. 4A illustrates an example of position data, and FIG. 4B illustrates an example of shape data.

FIG. 9 illustrates example positions used to generate a path.

FIG. 20 illustrates an example of history data.

FIG. 22 illustrates a schematic configuration of a machine tool according to a second embodiment.

FIG. 24 illustrates an example machining program specified in an EIA/ISO format.

DESCRIPTION OF THE EMBODIMENTS

Figure 2:
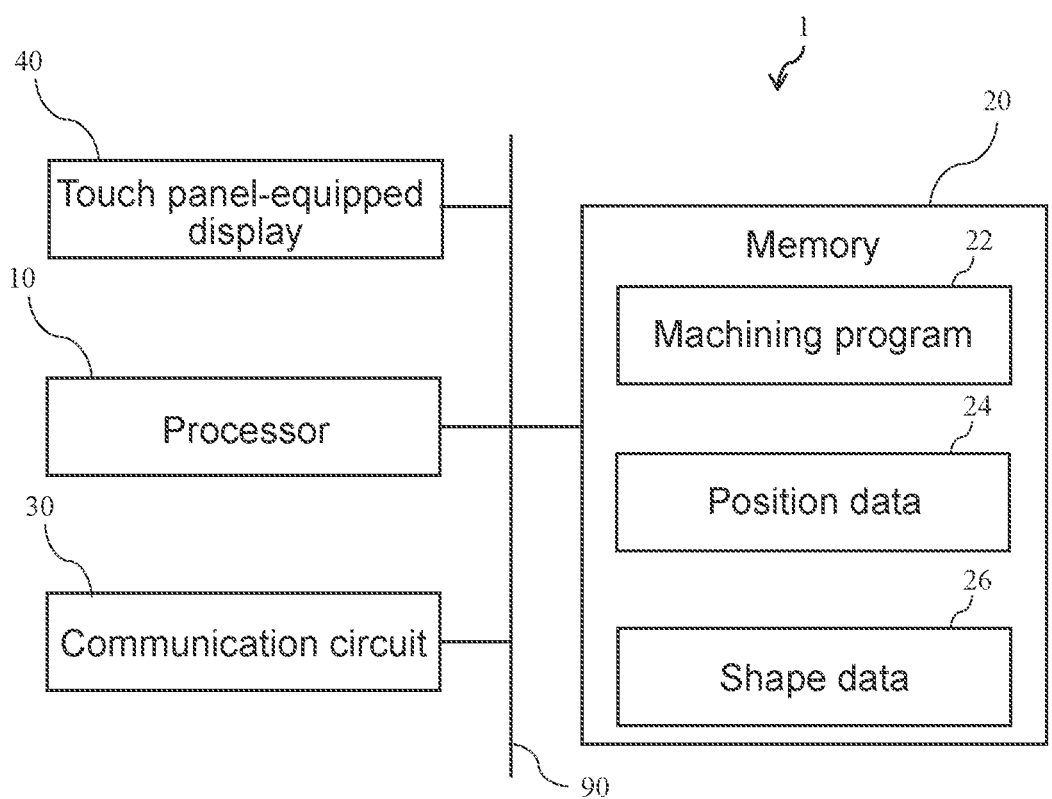
FIG. 2 is a hardware block diagram of a controller.

The present invention will now be described with reference to the accompanying drawings, wherein like reference numerals designate corresponding or identical elements throughout the various drawings.

First Embodiment

FIG. 1 illustrates a schematic configuration of a machine tool 100 according to the first embodiment. It is to be noted that in FIG. 1, the X axis is along the height direction of the machine tool 100, the Y axis is along the depth direction of the machine tool 100, and the Z axis is along the width direction of the machine tool 100. In this embodiment, an axis parallel to rotation axis A3 of the workpiece spindle 122, which holds a workpiece, is regarded as Z axis, according to a JIS standard. This configuration, however, is not intended as limiting how the directions of the machine tool 100 correspond to the axes.

The machine tool 100 performs turning with respect to a workpiece. In this embodiment, in at least one machining step of a plurality of machining steps, the machine tool 100 changes the direction in which the turning tool cuts the workpiece. An example effect of this configuration is to reduce chatter vibrations occurrable during turning.

As illustrated in FIG. 1, the machine tool 100 includes a column 110, a workpiece headstock 120, and a tool exchanger 130. The column 110, the workpiece headstock 120, and the tool exchanger 130 are mounted on a base 140.

The column 110 is movable in the Y axis direction and the Z axis direction on the base 140. On the column 110, a tool headstock 112 is mounted. The tool headstock 112 is movable in the X axis direction relative to the column 110. The tool headstock 112 is swingable about swinging axis A1, which is along the Y axis direction, relative to the column 110. On the tool headstock 112, a tool spindle 114 is mounted. The tool spindle 114 is rotatable about rotation axis A2 relative to the tool headstock 112. The rotation axis A2 is orthogonal to the swinging axis A1. The tool spindle 114 is holding a first turning tool 900.

The workpiece headstock 120 includes the workpiece spindle 122. The workpiece spindle 122 is rotatable about the rotation axis A3. The rotation axis A3 is along the Z axis direction. To the workpiece spindle 122, a workpiece W1 is attached.

The tool exchanger 130 exchanges the tool attached to the tool spindle 114. Specifically, the tool exchanger 130 includes a magazine arm 132 and a stocker 134. The magazine arm 132 is swingable about an axis that is along the Z axis direction. The magazine arm 132 is movable in the X axis direction relative to the stocker 134. The stocker 134 stores a plurality of turning tools aligned in the X axis direction. The plurality of turning tools stored in the stocker 134 include a second turning tool 910.

The tool exchanger 130 exchanges turning tools according to the following procedure. With the rotation axis A2 pointed along the Z axis direction, the column 110 approaches the tool exchanger 130 in the Z axis direction. The magazine arm 132 includes: a first gripper at one end of the magazine arm 132 in the direction in which the magazine arm 132 extends; and a second gripper at the other end of the magazine arm 132 in the direction. In order to remove the first turning tool 900 attached to the tool spindle 114, the first gripper holds the first turning tool 900 attached to the tool spindle 114. More specifically, the magazine arm 132 swings about the axis that is along the Z axis direction by a predetermined swinging angle, and the first gripper holds the first turning tool 900 while at the same time the second gripper holds the second turning tool 910 stored in the stocker 134. The column 110 moves away from the tool exchanger 130 in the Z axis direction, making the first turning tool 900 removed from the tool spindle 114. In order to attach the second turning tool 910 to the tool spindle 114, the magazine arm 132 swings about the axis that is along the Z axis direction, causing the second turning tool 910 held by the second gripper to be moved to a tool attachment position. The column 110 approaches the tool exchanger 130 in the Z axis direction, making the second turning tool 910 attached to the tool spindle 114.

The machine tool 100 includes a controller 1, which controls the rotational motions about the rotation axes, the swinging motions about the swinging axes, and the movements in the axis directions. The controller 1 is connected to the base 140. In this respect, the controller 1 may be connected to another position on the machine tool 100 or may be provided separately from the base 140 insofar as the controller 1 is able to transmit control signals and/or receive detection results.

FIG. 2 is a hardware block diagram of the controller 1. As illustrated in FIG. 2, the controller 1 includes a processor 10, a memory 20, a communication circuit 30, and a touch panel-equipped display 40. The processor 10, the memory 20, the communication circuit 30, and the touch panel-equipped display 40 are connected to each other via a bus 90. The memory 20 stores programs and data necessary for machining. The processor 10 reads a program stored in the memory 20 and executes the program that has been read. In this manner, the controller 1 implements its functions. The functions implemented by the controller 1 include control of performing of turning. Specifically, the memory 20 stores a machining program 22. The machining program 22 includes a control command for performing turning.

The workpiece spindle 122 is an example of the workpiece holding means. The tool spindle 114 is an example of the tool holding means (tool holding device). The column 110 and the tool headstock 112 are examples of the moving means and examples of the movement mechanism. The touch panel-equipped display 40 is an example of the inputting means (input interface, selection interface), is an example of the display means, and is an example of the input circuit. The communication circuit 30 is another example of the inputting means and another example of the input circuit. The tool exchanger 130 is an example of the tool exchanging means. The memory 20 is an example of the storing means. The processor 10 is an example of the control means, is an example of the control circuitry, and is an example of the path generating means.

Figure 3A:
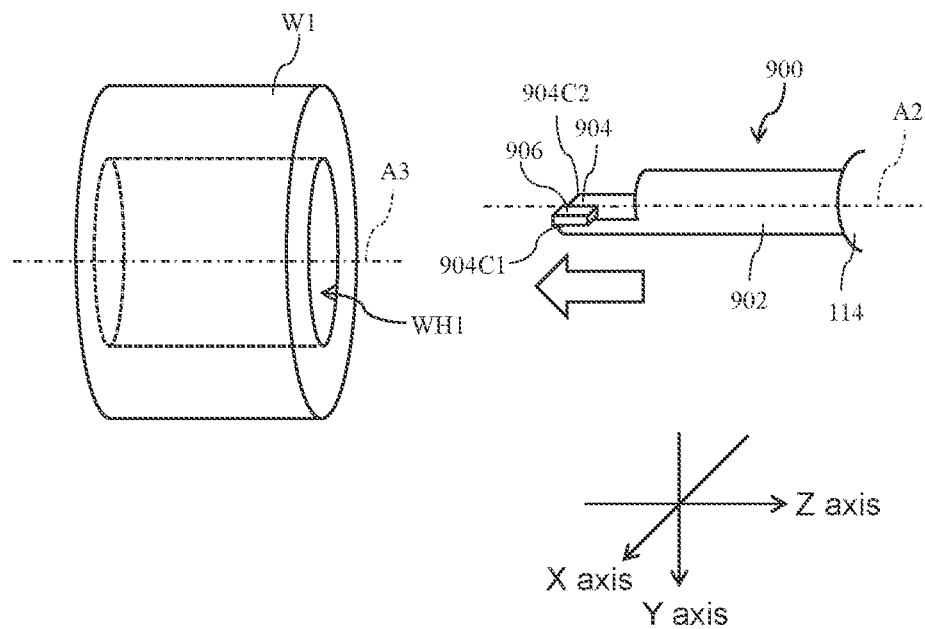
FIG. 3A is a schematic of a workpiece and a turning tool.
Figure 3B:
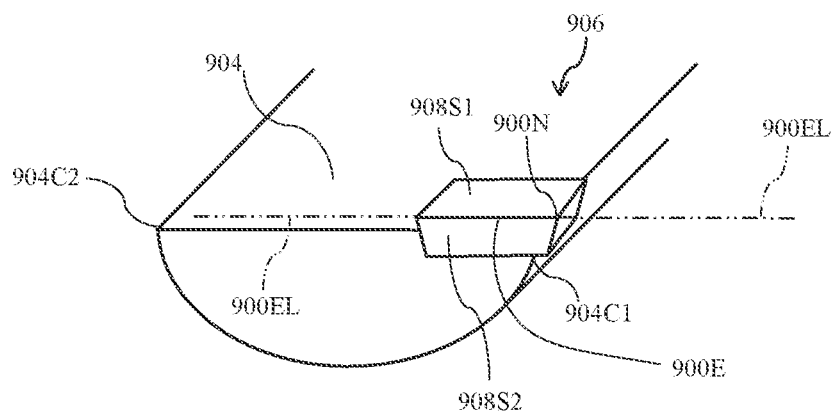
FIG. 3B is an enlarged part of the schematic of the turning tool.

Next, description will be made with regard to: the workpiece W1, which is subjected to turning; and the first turning tool 900, which performs turning with respect to the workpiece W1. FIG. 3A is a schematic of the workpiece W1 and the first turning tool 900. FIG. 3B is an enlarged part of the schematic of the first turning tool 900. As illustrated in FIG. 3A, in turning, the tool headstock 112 swings about the swinging axis A1 to make the rotation axis A2 substantially parallel to the rotation axis A3. The first turning tool 900 includes an extension portion 902 and a chip 906. The extension portion 902 extends in the axial direction (Z axis direction) of the rotation axis A2 with the first turning tool 900 held by the tool spindle 114. The chip 906 is provided at an end 904 of the extension portion 902 in the axial direction of the rotation axis A2 with the first turning tool 900 held by the tool spindle 114. More specifically, the chip 906 is provided at a first corner 904C1 of the end 904 in a direction (X axis direction in FIG. 3A) orthogonal to the direction in which the extension portion 902 extends. No chip 906 is provided at a second corner 904C2 of the end 904 in the direction orthogonal to the direction in which the extension portion 902 extends. As illustrated in the enlarged view in FIG. 3B, the chip 906 includes a blade 900E. The blade 900E is substantially parallel to the direction (X axis direction in FIG. 3A) orthogonal to the direction in which the extension portion 902 extends. The blade 900E is an edge defined between a rake face 908S1 and a flank face 908S2. The rake face 908S1 is substantially parallel to the direction in which the extension portion 902 extends. The flank face 908S2 is substantially orthogonal to the direction in which the extension portion 902 extends. The blade 900E includes a nose 900N. The nose 900N is provided at an outer one end of the first turning tool 900, the outer one end being one of the two ends of the blade 900E in the direction in which the blade 900E extends. The blade 900E has an extension line 900EL along the X axis direction, which will be described later.

It is to be noted that the first turning tool 900 will not be limited to the example illustrated in FIGS. 3A and 3B. For example, the chip 906, which is a replaceable chip, may be omitted. That is, the first turning tool 900 may have a structure without the chip 906 and with the blade 900E provided on the end 904.

As illustrated in FIG. 3A, the workpiece W1 has a hollow-cylindrical shape. When the workpiece W1 is in a state of being held by the workpiece spindle 122, the hollow portion, WH1, of the workpiece W1 extends in a direction substantially parallel to the rotation axis A2. It is to be noted, however, that the shape of the workpiece W1 will not be limited to the shape illustrated in FIG. 3A.

In this embodiment, the machining program 22 defines positions in a three-dimensional coordinate system for workpiece W1 turning purposes. Specifically, as illustrated in FIG. 2, the memory 20 stores position data 24 and shape data 26. As illustrated in FIG. 4A, the position data 24 includes workpiece spindle position and tool spindle position. As illustrated in FIG. 4A, the workpiece spindle position and the tool spindle position are defined in a three-dimensional coordinate system made up of X axis, Y axis, and Z axis. It is to be noted that in this embodiment, the workpiece spindle position corresponds to the origin of the three-dimensional coordinate system. Therefore, the workpiece spindle position is defined as (0, 0, 0) in the three-dimensional coordinate system. This configuration, however, is not intended as limiting the origin of the three-dimensional coordinate system. It is also to be noted that the tool spindle position corresponds to the initial position of the tool spindle 114 at the time before turning. It is also to be noted that the positive direction and the negative direction of each of the axes may be defined in any manner deemed convenient. It is also to be noted that the position data 24 may include an additional position not illustrated in FIG. 4A. It is further to be noted that the machining program 22 may be included in the position data 24.

As illustrated in FIG. 4B, the shape data 26 includes workpiece shape data 260 and turning tool shape data 262. The workpiece shape data 260 includes values indicating shapes of a plurality of workpieces. For example, as illustrated in FIG. 4B, the workpiece shape data 260 includes outer diameter, inner diameter, and height of the hollow-cylindrical workpiece W1. A workpiece W2 does not need to undergo inner diameter turning and, therefore, is defined by outer diameter and height. It is to be noted that the height of a workpiece refers to the length of the workpiece in the Z axis direction with the workpiece held by the workpiece spindle 122. The turning tool shape data 262 includes values indicating shapes of a plurality of turning tools. For example, as illustrated in FIG. 4B, the turning tool shape data 262 includes extension portion length, nose position, blade length, and blade direction. The extension portion length refers to the length of the extension portion 902 in the direction in which the extension portion 902 extends, which is illustrated in FIG. 3A. The nose position refers to a relative position of the nose 900N relative to the tool spindle position with the first turning tool 900 attached to the tool spindle 114. The blade length refers to the length of the blade 900E in the direction in which the blade 900E extends, which is illustrated in FIG. 3A. The blade direction refers to the direction in which the blade 900E extends relative to the direction in which the extension portion 902 extends. Using the position data 24 and the shape data 26, the positions of the workpiece W1 (the workpiece W2) and the positions of the first turning tool 900 (the second turning tool 910) in the three-dimensional coordinate system are calculated. It is to be noted, however, that the shape data 26 will not be limited in data form to the example illustrated in FIG. 4B insofar as the shapes of the workpiece W1, the workpiece W2, the first turning tool 900, and the second turning tool 910 can be identified in the machining program 22.

Figure 5:
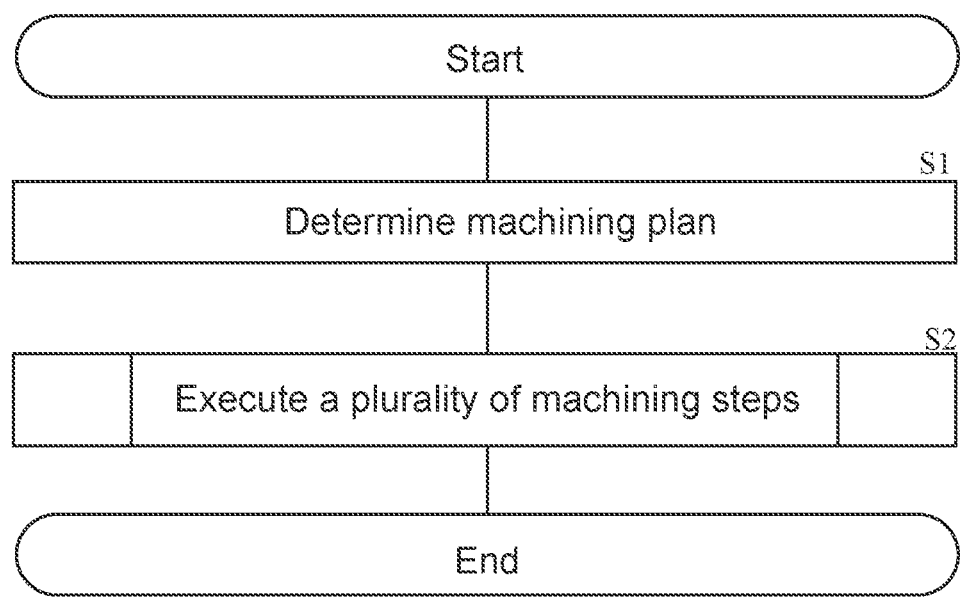
FIG. 5 is a flowchart of motions of the controller.

Next, the turning performed in this embodiment will be described. FIG. 5 is a flowchart of motions of the controller 1. Upon execution of the machining program 22, the processor 10 makes the motions illustrated in FIG. 5. First, the processor 10 determines a machining plan (step S1). Then, the processor 10 executes a plurality of machining steps (step S2).

It is assumed that when the workpiece is changed to another workpiece, the number of times of machining steps increases. It is also assumed that when a change is made in machining content, the number of times of machining steps increases, even if the workpiece is not changed. The machining content is any one of, for example, outer diameter turning, inner diameter turning, end surface turning, threading, and grooving. The outer diameter turning refers to a form of machining performed by cutting the outer diameter (outer circumferential surface) of the workpiece W1 rotating about the rotation axis A3. The inner diameter turning refers to a form of machining performed by cutting the inner diameter (inner circumferential surface) of the workpiece W1 rotating about the rotation axis A3. The end surface turning refers to a form of machining performed by cutting the end surface of the workpiece W1 (the surface orthogonal to the rotation axis A3) rotating about the rotation axis A3. The threading refers to a form of machining performed by cutting at least one of the outer diameter and the inner diameter of the workpiece W1 rotating about the rotation axis A3 so as to form a screw groove having a spiral shape extending the circumferential direction and the axial direction of the rotation axis A3. The grooving refers to a form of machining performed by cutting at least one of the outer diameter and the inner diameter of the workpiece W1 rotating about the rotation axis A3 so as to form a groove extending in the circumferential direction of the rotation axis A3. It is to be noted, however, that the machining content will not be limited to these forms of machining.

It is also to be noted that the number of times of machining steps may increase when the turning tool is exchanged to another turning tool, or a plurality of turning tools (a rough machining tool and a finishing tool) may be used in one time of machining step. Thus, the number of turning tools used may not necessarily match the number of times of machining steps. It is assumed that when the spindle for the workpiece is changed (when how to hold the workpiece is changed), the number of times of machining steps increases.

Figure 6:
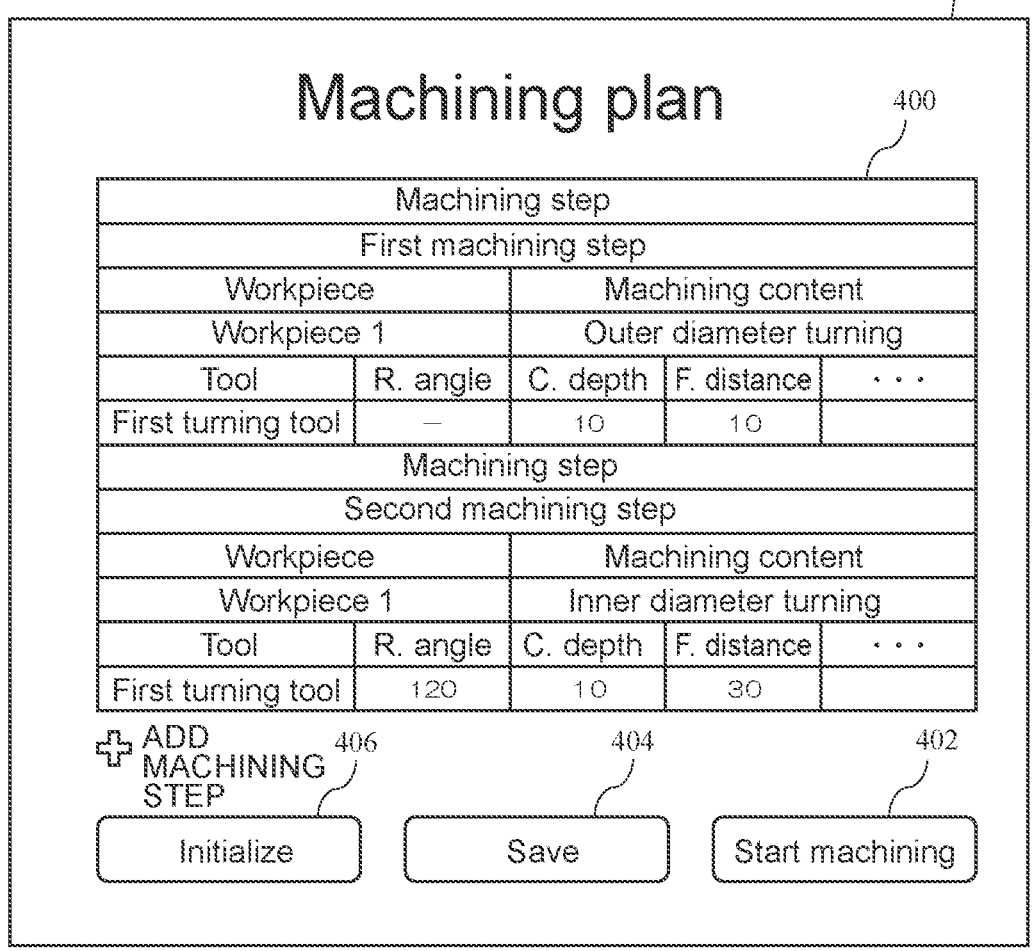
FIG. 6 illustrates an example of content displayed when a rotational angle is input.

At step S1, in order to determine a machining plan, the processor 10 makes an operator input the machining plan. The machining plan includes a plurality of machining steps executed on a time-series basis. For example, as illustrated in FIG. 6, the processor 10 causes the touch panel-equipped display 40 to display a plan table 400 of the machining plan. The plan table 400 includes various setting values for each machining step. For example, the plan table 400 includes workpiece, machining content, and tool that are related to each machining step. In the example illustrated in FIG. 6, machining steps that are input are: a first machining step for performing outer diameter turning with respect to the workpiece W1; and a second machining step for performing inner diameter turning with respect to the workpiece W1 that has undergone the outer diameter turning. For the turning tool, cutting depth and feeding distance are related to each other and included in the plan table 400. The various setting values included in the plan table 400 can be changed by making a touch manipulation on the touch panel-equipped display 40. The touch panel-equipped display 40 displays a software key 402, a software key 404, and a software key 406, in addition to the plan table 400. When the software key 402 is touched, the processor 10 proceeds to step S2 and starts machining using the machine tool 100 based on the machining plan defined on the plan table 400. When the software key 404 is touched, the processor 10 causes the memory 20 to store the machining plan input in the plan table 400. When the software key 406 is touched, the processor 10 initializes the machining plan input in the plan table 400. It is to be noted that the software key 402, the software key 404, and the software key 406 may be implemented in hardware form provided outside the touch panel-equipped display 40 (for example, physical switch buttons).

The various setting values included in the plan table 400 include rotational angle corresponding to a machining step. The rotational angle is an example of the input value and related to cutting direction, described later. In the example illustrated in FIG. 6, a rotational angle of 120° is input for the first turning tool used in the second machining step. It is to be noted that the various setting values included in the plan table 400 may be preset in, for example, the machining program 22, in which case the operator may input the rotational angle alone. Here, the rotational angle set in the machining program 22 is an example of an additional code.

It is to be noted that in this embodiment, the rotational angle is input only when the machining content is any one of inner diameter turning, inner diameter threading, and inner diameter grooving. It is to be noted, however, that the rotational angle may be input for another machining content (for example, outer diameter turning, end surface turning, outer diameter threading, and outer diameter grooving).

It is also to be noted that the machining plan determination made at step S1 will not be limited to the above-described example. In determining a machining plan, the processor 10 may obtain, via the communication circuit 30 of the controller 1, a machining plan from a device or an apparatus other than the controller 1. A possible example is that only the rotational angle is input from a device or an apparatus other than the controller 1 and received by the communication circuit 30.

Figure 7:
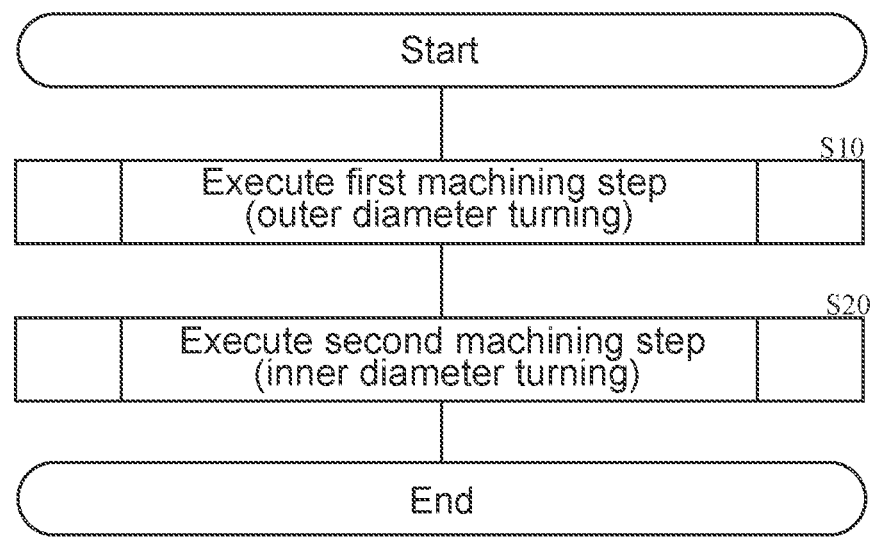
FIG. 7 is a flowchart of motions of the controller for executing a plurality of machining steps.

FIG. 7 is a flowchart of a sub-process executed at step S2 illustrated in FIG. 5. It is to be noted, however, that the flowchart illustrated in FIG. 7 corresponds to the example illustrated in FIG. 6, where the first machining step and the second machining step have been planned. The processor 10, accordingly, may execute machining steps three or more times based on the machining plan. First, in order to perform turning with respect to the outer diameter of the workpiece W1, the processor 10 controls execution of the first machining step (step S10). Next, in order to perform turning with respect to the inner diameter of the workpiece W1, the processor 10 controls execution of the second machining step (step S20).

Figure 8:
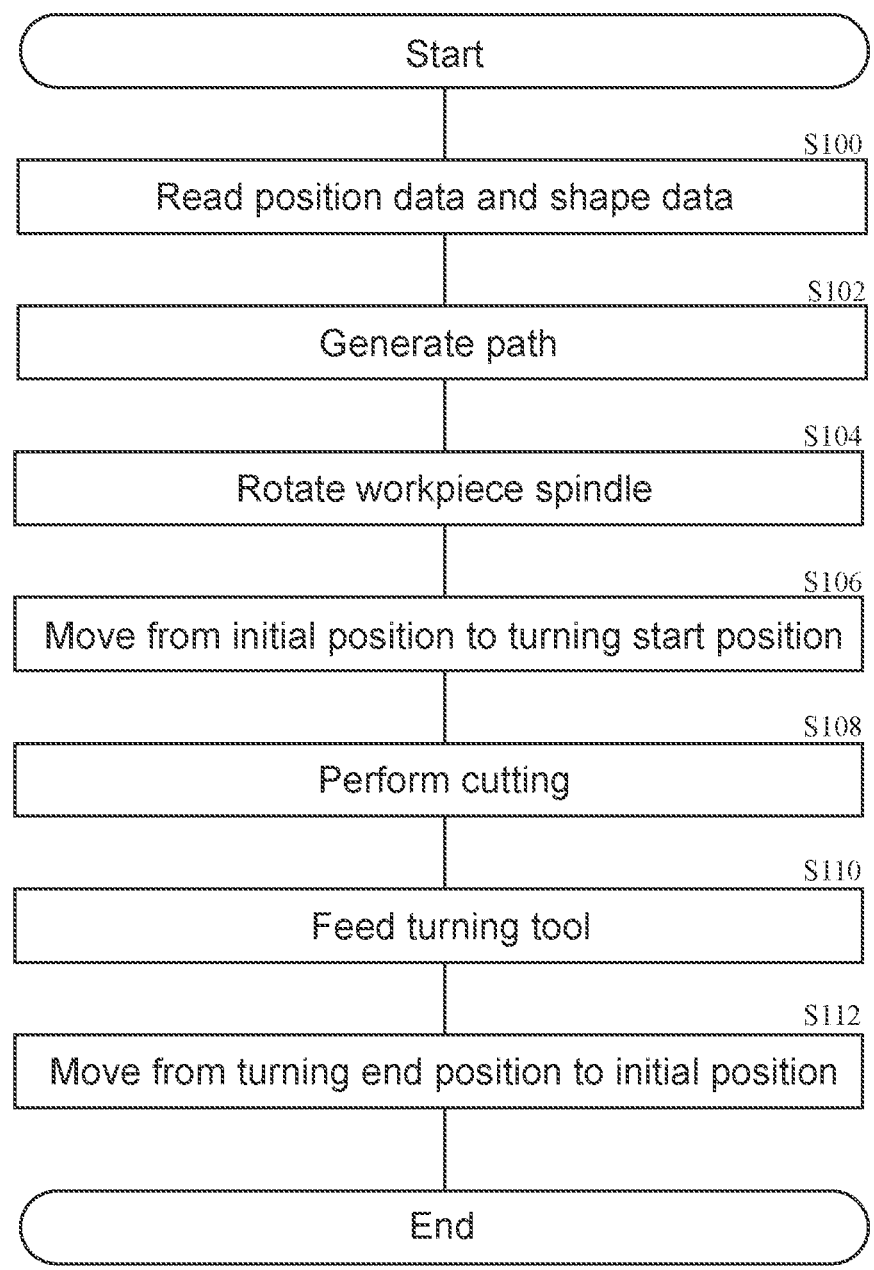
FIG. 8 is a flowchart of motions of the controller for executing a first machining step.
Figure 10A:
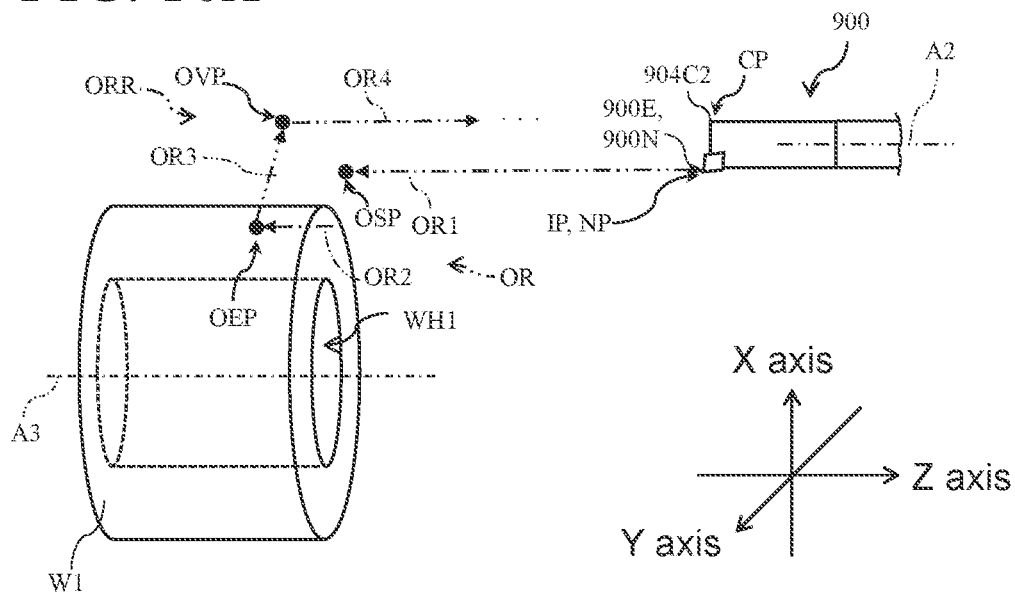
FIG. 10A illustrates how the turning tool moves in the first machining step.
Figure 10B:
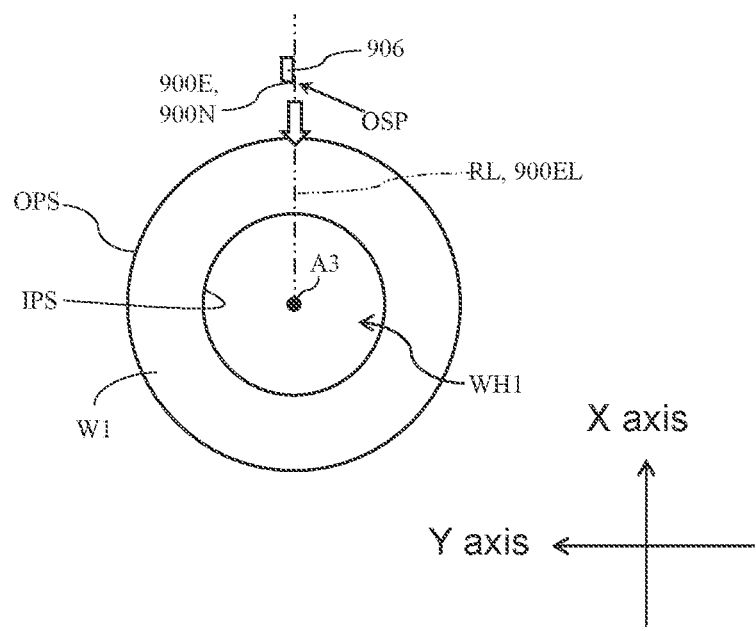
FIG. 10B illustrates cutting performed with respect to a workpiece in the first machining step.

FIG. 8 is a flowchart of motions of the controller 1 for executing the first machining step, illustrating a sub-process of step S10 illustrated in FIG. 7. FIG. 9 illustrates example positions used to generate a path. FIG. 10A illustrates how the first turning tool 900 moves in the first machining step, and FIG. 10B illustrates cutting performed with respect to the workpiece W1 in the first machining step. It is to be noted, however, that among the configuration of the first turning tool 900, the chip 906 alone is illustrated in FIG. 10B.

The processor 10 reads the position data 24 and the shape data 26 from the memory 20 (step S100). Then, the processor 10 generates path OR (step S102). Specifically, based on the position data 24, the shape data 26, and the machining plan, the processor 10 calculates initial position IP, turning start position OSP, and turning end position OEP in a three-dimensional coordinate system.

The initial position IP corresponds to nose position NP of the nose 900N of the first turning tool 900 at the time before the start of the first machining step. For example, the initial position IP may be the nose position NP at the time when the tool spindle 114 is located at a position where the turning tool is exchangeable by the tool exchanger 130. The turning start position OSP corresponds to the nose position NP at the time when the first turning tool 900 approaching the workpiece W1 starts the outer diameter turning. The turning end position OEP corresponds to the nose position NP at the time of the end of the turning performed with respect to the outer diameter of the workpiece W1 by the first turning tool 900. The position of the workpiece spindle 122 corresponds to the origin of the three-dimensional coordinate system. In light of this, the value, CSx (see FIG. 9), of the turning start position OSP in the X axis direction is set at a value larger than the outer diameter of the workpiece W1. The value of the turning start position OSP in the Y axis direction is set at 0. The value, CSz, of the turning start position OSP in the Z axis direction is set at a value that prevents the turning start position OSP from overlapping the workpiece W1 in the Z axis direction. The value, CEx, of the turning end position OEP in the X axis direction is a value smaller than the value CSx by the cutting depth (a value set when the machining plan was determined). As described later, the first turning tool 900 is fed along the Z axis direction. In light of this, the value of the turning end position OEP in the Y axis direction is set at 0. The value, CEz, of the turning end position OEP in the Z axis direction is a value different from the value CSz by the feeding distance (a value set when the machining plan was determined).

No-blade corner position CP is a position that corresponds to the second corner 904C2 of the first turning tool 900 and where no chip 906 is provided. The nose position NP and the no-blade corner position CP change together with the movement, swinging, and rotation of the first turning tool 900.

As illustrated in FIG. 10A, the processor 10 generates the path OR, which passes the initial position IP, the turning start position OSP, and the turning end position OEP. The path OR includes: a path OR1, which extends from the initial position IP to the turning start position OSP; and a path OR2, which extends from the nose position NP after the cutting to the turning end position OEP. The nose position NP after the cutting is calculated based on: the cutting direction (an example of a basic cutting direction) along the X axis direction; the cutting depth that has been set; and the turning start position OSP. Also, the path OR is calculated such that the portions of the first turning tool 900 other than the blade 900E are out of contact with the workpiece W1. For example, the path OR is generated such that the no-blade corner position CP is prevented from overlapping the workpiece W1. It is to be noted, however, that the second corner 904C2 is only one example of the portions of the first turning tool 900 other than the blade 900E.

At step S102, the processor 10 also generates a return path ORR, which extends from the turning end position OEP to the initial position IP. The return path ORR includes: a path OR3, which extends from the turning end position OEP to a withdrawal position OVP; and a path OR4, which extends from the withdrawal position OVP to the initial position IP. The withdrawal position OVP is set at a position farther away from the workpiece W1 than the turning end position OEP is away from the workpiece W1. The return path ORR is generated such that the portions of the first turning tool 900 other than the blade 900E (for example, the second corner 904C2) are prevented from overlapping the workpiece W1.

Referring again to FIG. 8, the processor 10 next causes the workpiece spindle 122 to rotate about the rotation axis A3 (step S104). The processor 10 controls the movement of the column 110 and the movement of the tool headstock 112 so that the nose position NP moves along the path OR1 from the initial position IP to the turning start position OSP (step S106). Then, cutting is performed (step S108).

As illustrated in FIG. 10B, the processor 10 moves the first turning tool 900 in the X axis direction toward the outer circumferential surface, OPS, of the workpiece W1 by the cutting depth. In this respect, as illustrated in FIG. 4B, the angle formed between the extension line 900EL of the blade 900E and reference line RL is 0°. It is to be noted, however, that the reference line RL is substantially parallel to the X axis direction and passes the rotation axis A3. It is also to be noted that the reference line RL coincides with the extension line 900EL at the time when the tool headstock 112 has swung about the swinging axis A1 so that the rotation axis A2 is substantially parallel to the rotation axis A3. It is also to be noted that the initial rotation position of the tool spindle 114 (the initial rotation position of the tool holding means) refers to the rotation position of the tool spindle 114 with the extension line 900EL matching the reference line RL. When the cutting ends, a view of the machine tool 100 in the Z axis direction shows that the blade 900E overlaps the workpiece W1 It is to be noted, however, that the blade 900E and the workpiece W1 are out of contact with each other at this point of time.

Referring again to FIG. 8, when the cutting ends (step S108), the processor 10 performs feeding control with respect to the first turning tool 900 (step S110). Specifically, the processor 10 controls the movement of the column 110 in the Z axis direction so that the nose position NP moving along the path OR2 reaches the turning end position OEP. This makes the blade 900E perform turning with respect to the outer diameter of the workpiece W1 rotating about the rotation axis A3. Then, the processor 10 controls the movement of the column 110 and the movement of the tool headstock 112 so that the nose position NP moving along the return path ORR moves from the turning end position OEP to the initial position IP through the withdrawal position OVP (step S112). Thus, the first machining step ends.

It is to be noted that the cutting (step S108) and the feeding (step S110) may be repeated any times deemed convenient. For example, the machine tool 100 may feed the first turning tool 900 to a cutting depth of 1 mm in the outer diameter of the workpiece W1, and then may feed the first turning tool 900 to an additional cutting depth of 1 mm in the outer diameter of the workpiece W1.

Figure 11:
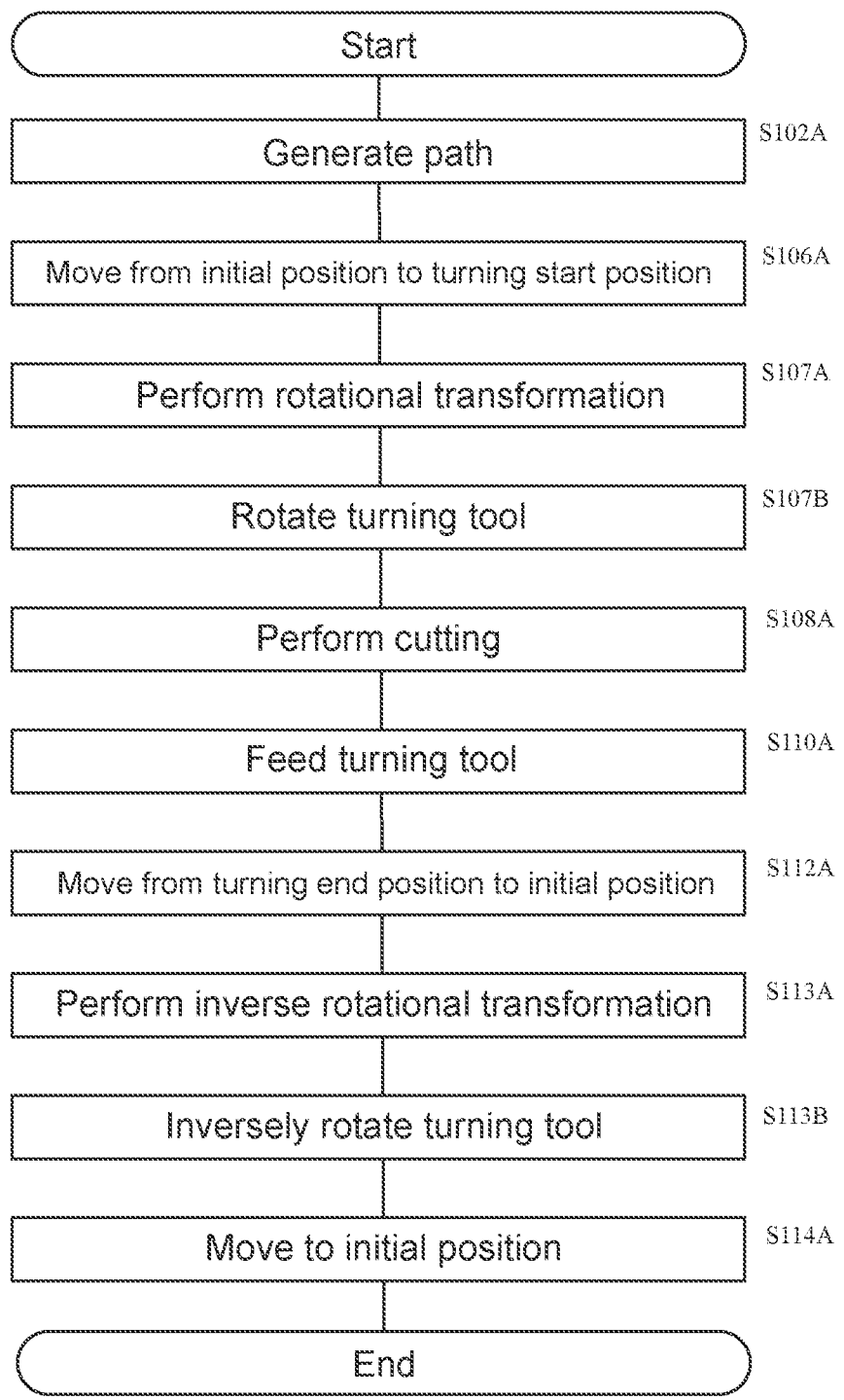
FIG. 11 is a flowchart of motions of the controller for executing a second machining step.
Figure 12A:
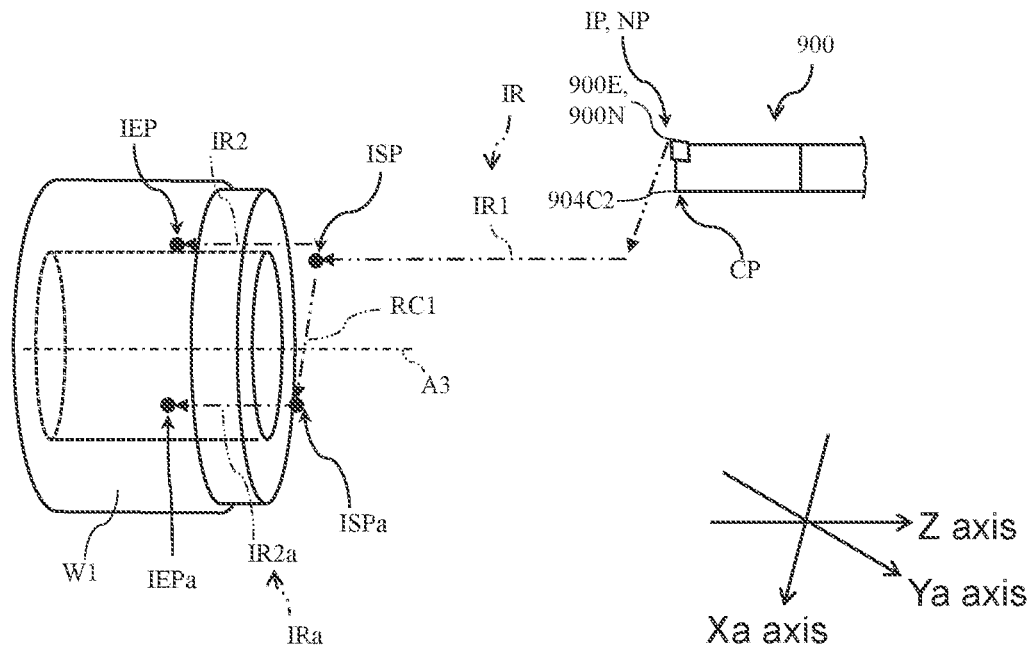
FIG. 12A illustrates a path in a pre-form three-dimensional coordinate system, which is not rotationally transformed yet, and a path in a rotationally transformed three-dimensional coordinate system.
Figure 12B:
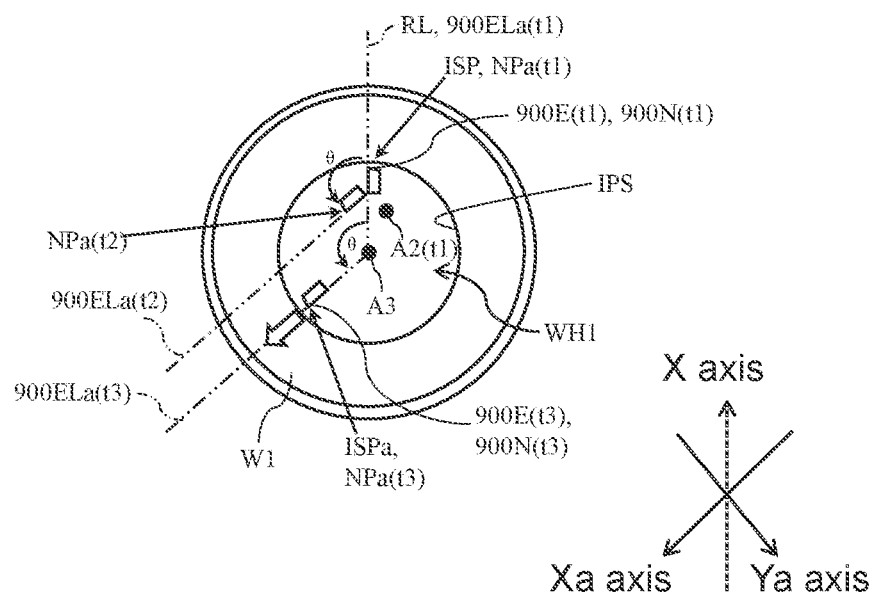
FIG. 12B illustrates cutting performed with respect to the workpiece in the rotationally transformed three-dimensional coordinate system.
Figure 13A:
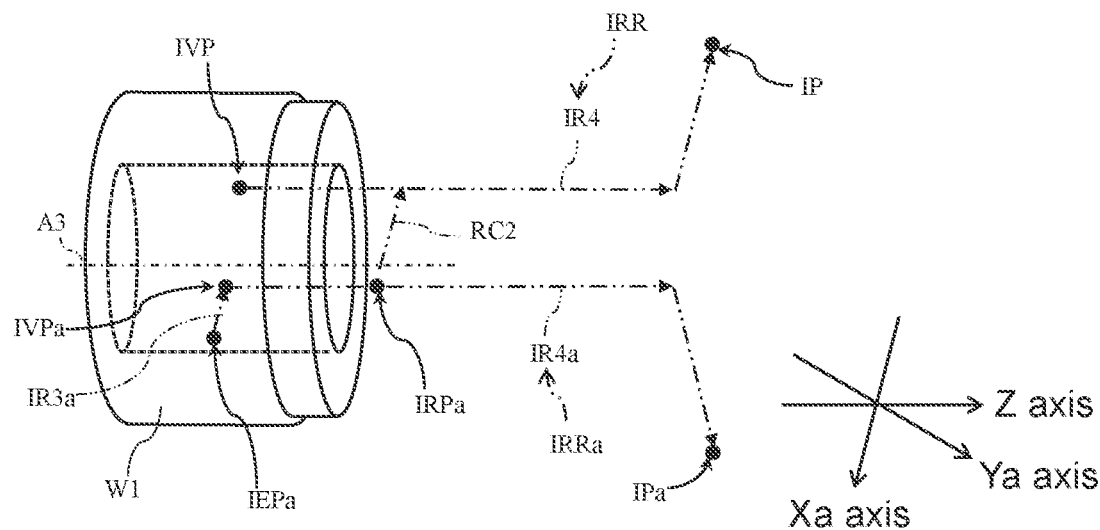
FIG. 13A illustrates a return path in the rotationally transformed three-dimensional coordinate system and a return path in the pre-form three-dimensional coordinate system.
Figure 13B:
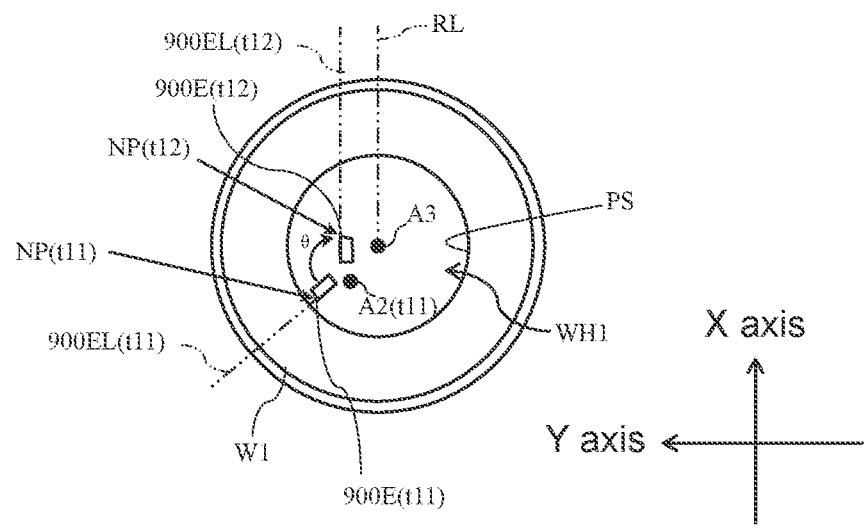
FIG. 13B illustrates how the turning tool rotates at the return position.

FIG. 11 is a flowchart of motions of the controller 1 for executing the second machining step, in which inner diameter turning is defined, illustrating a sub-process step S20 illustrated in FIG. 7. FIG. 12A illustrates: a path IR in a pre-form three-dimensional coordinate system, which is not rotationally transformed yet; and a path IRa in a rotationally transformed three-dimensional coordinate system (a converted three-dimensional coordinate system: a three-dimensional coordinate system defined by an Xa axis, a Ya axis, and a Z axis in FIG. 12A is the converted three-dimensional coordinate system). FIG. 12B illustrates cutting performed with respect to the workpiece W1 in the rotationally transformed three-dimensional coordinate system. FIG. 13A illustrates: a return path IRRa in a rotationally transformed three-dimensional coordinate system; and a return path IRR in a pre-form three-dimensional coordinate system, which is not rotationally transformed yet. FIG. 13B illustrates how the first turning tool 900 rotates at the return position IRPa. It is to be noted, however, that in FIGS. 12A, 12B, and 13A, the characters and numbers suffixed with "a" denote positions and lines in a rotationally transformed three-dimensional coordinate system. It is also to be noted that in FIGS. 12B and 13B, t1, t2, t3, t11, and t12 denote time.

The processor 10 generates a path IR for performing inner diameter turning with respect to the workpiece W1 (step S102A). The path IR is generated in a manner similar to the manner in which the path OR is generated. That is, the path IR is generated based on the position data 24, the shape data 26, and a machining plan. It is to be noted, however, that since the inner diameter turning is defined in the second machining step, the value of turning start position ISP in the X axis direction is set at a value smaller than the inner diameter of the workpiece W1. It is also to be noted that the cutting direction is set at a direction that is along the X axis direction and away from the rotation axis A3. The path IR includes: a path IR1, which extends from the initial position IP to the turning start position ISP; and a path IR2, which extends from the nose position NP after the cutting to turning end position IEP. The processor 10 also generates a return path IRRs. The return path IRR includes: a path IR3, which extends from the turning end position IEP to withdrawal position IVP; and a path IR4, which extends from the withdrawal position IVP to the initial position IP.

The processor 10 controls the movement of the column 110 and the movement of the tool headstock 112 so that the nose position NP moving along the path IR1 from the initial position IP reaches the turning start position ISP (step S106A).

When the nose position NP has reached the turning start position ISP (step S106A), the processor 10 rotationally transforms the three-dimensional coordinate system (step S107A). Specifically, the processor 10 obtains a new Xa axis (an example of a target cutting direction) by rotating the X axis (an example of a basic cutting direction) about the Z axis by a rotational angle (an example of a target angle) of θ, which was set at the time when the machining plan was determined (step S1 in FIG. 5) and which corresponds to the second machining content. Similarly, the Y axis is rotated about the Z axis by the rotational angle θ and thus changed into a new Ya axis. This rotation is performed on the machining program 22, and, therefore, no physical configuration is rotated at step S107A. Specifically, the positions (for example, the turning start position ISP) managed only on the machining program 22 are rotated together with the X axis and the Y axis.

When a three-dimensional coordinate system is rotationally transformed on the machining program 22, there occur discrepancies between actual positions (for example, the nose position NP) and positions dealt with on the machining program 22. In order to obtain the discrepancies, the processor 10 calculates, based on a rotational matrix using the rotational angle θ, the positions (for example, the nose position NP) in a rotationally transformed three-dimensional coordinate system. In this manner, discrepancies between the actual positions and the positions dealt with on the machining program 22 are obtained. No discrepancy occurs in the value of the position in the Z axis direction. In light of this, the rotational matrix using the rotational angle θ may be defined as a 2-by-2 matrix that rotationally transforms the X axis direction value and the Y axis direction value.

In the example illustrated in FIG. 12B, the processor 10 rotates the first turning tool 900 so that the blade 900E (t1) rotates about the rotation axis A2 by the angle θ (step S107B). In this embodiment, the processor 10 rotates the tool spindle 114 about the rotation axis A2 by the angle θ. In this manner, the processor 10 rotates the blade 900E (t1) about the rotation axis A2 by the angle θ. This makes the nose position NPa (t1) move to the nose position NPa (t2). Extension line 900ELa (t1) of the blade 900E (t1) is rotated about the rotation axis A2 (t1) by the angle θ and thus changed into extension line 900ELa (t2). Further, the processor 10 moves the first turning tool 900 so that the nose position NPa (t2) after the rotation moves along a corrected path RC1 and reaches turning start position (a converted turning start position) ISPa. This makes the nose position NPa (t3) reach the turning start position ISPa, with the extension line 900ELa (t3) substantially parallel to the Xa axis and substantially past the rotation axis A3. This ensures that the discrepancies obtained at step S107A are eliminated.

It is to be noted, however, that it is only necessary for the blade 900E to rotate about a blade rotation axis parallel to the rotation axis A3 by the rotational angle θ, and that the processor 10 may control the movement of the column 110 and the movement of the tool headstock 112, in addition to the rotation of the tool spindle 114, so that the first turning tool 900 rotates about the rotation axis A3. Thus, the blade rotation axis of the blade 900E may coincide with the rotation axis A3. When the blade rotation axis coincides with the rotation axis A3, it is only by a rotation of the blade 900E that the nose position NPa coincides with the turning start position ISPa. Thus, when the blade rotation axis coincides with the rotation axis A3, it is not necessary to calculate the corrected path RC1.

Referring again to FIG. 11, the processor 10 moves the first turning tool 900 from the turning start position ISPa in the Xa axial direction (an example of the target cutting direction) by the cutting depth toward the inner circumferential surface, IPS, of the workpiece W1 (step S108A). Then, the processor 10 moves the first turning tool 900 in the Z axis direction by the feeding distance (step S110A). In this manner, the inner diameter of the workpiece W1 is subjected to turning. It is to be noted, however, that step S108A and step S110A may be repeated any times deemed convenient, similarly to the outer diameter turning.

Next, step S112A and step S113A will be described by referring to FIGS. 13A and 13B.

At step S112A, the processor 10 controls the movement of the column 110 and the movement of the tool headstock 112 so that the nose position NPa moving from the turning end position (a converted turning end position) IEPa through the path IR3a reaches the withdrawal position IVPa. Then, the processor 10 controls the movement of the column 110 and the movement of the tool headstock 112 so that the nose position NPa moving from the withdrawal position IVPa through the path IR4a reaches the return position IRPa. As illustrated in FIG. 13A, the return position IRPa is provided on the path IR4a in such a manner that the return position IRPa does not overlap the workpiece W1 in the Z axis direction.

When the nose position NPa has reached the return position IRPa (step S112A), the processor 10 inversely rotationally transforms the three-dimensional coordinate system (step S113A). The rotational transformation performed at step S113A is opposite in direction to the rotational transformation performed at step S107A. Specifically, the processor 10 rotates the Xa axis and the Ya axis of the rotationally transformed three-dimensional coordinate system about the Z axis by the rotational angle (−θ). In this manner, the processor 10 returns the rotationally transformed three-dimensional coordinate system to the pre-form three-dimensional coordinate system. Then, the processor 10 uses an inverse matrix of the rotational matrix using the rotational angle θ to obtain discrepancies between actual positions (for example, the nose position NP) and positions dealt with on the machining program 22. Then, the processor 10 inversely rotates the first turning tool 900 (step S113B). The rotation of the first turning tool 900 at step S113B is different from the rotation of the first turning tool 900 at step S107B in that a rotational angle of −θ is used at step S113B. In the example illustrated in FIG. 13B, the processor 10 has rotated the tool spindle 114 about the rotation axis A2 (t11) by the rotational angle (−θ). This makes the blade 900E (t11), the nose position NP (t11), and the extension line 900EL (t11) respectively move to the blade 900E (t12), the nose position NP (t12), and the extension line 900EL (t12). It is to be noted, however, that it is only necessary for the blade 900E to rotate about a blade rotation axis parallel to the rotation axis A3 by the rotational angle (−θ), and that the first turning tool 900 may rotate about the rotation axis A3 by the rotational angle (−θ).

Then, the processor 10 controls the movement of the column 110 and the movement of the tool headstock 112 so that the nose position NP reaches the initial position IP (step S114A). More specifically, as illustrated in FIG. 13A, the processor 10 controls the movement of the column 110 and the movement of the tool headstock 112 so that the nose position NP moving along a corrected path RC2 reaches the path IR4 and then reaches the initial position IP through along the path IR4. It is to be noted, however, that the corrected path RC2 is based on a discrepancy between the actual nose position NP obtained at step S113A and the nose position NP dealt with on the machining program 22. It is to be noted that if the blade 900E rotates about the rotation axis A3 at step S113B, it is not necessary to generate the corrected path RC2. Thus, the second machining step ends.

Figure 14:
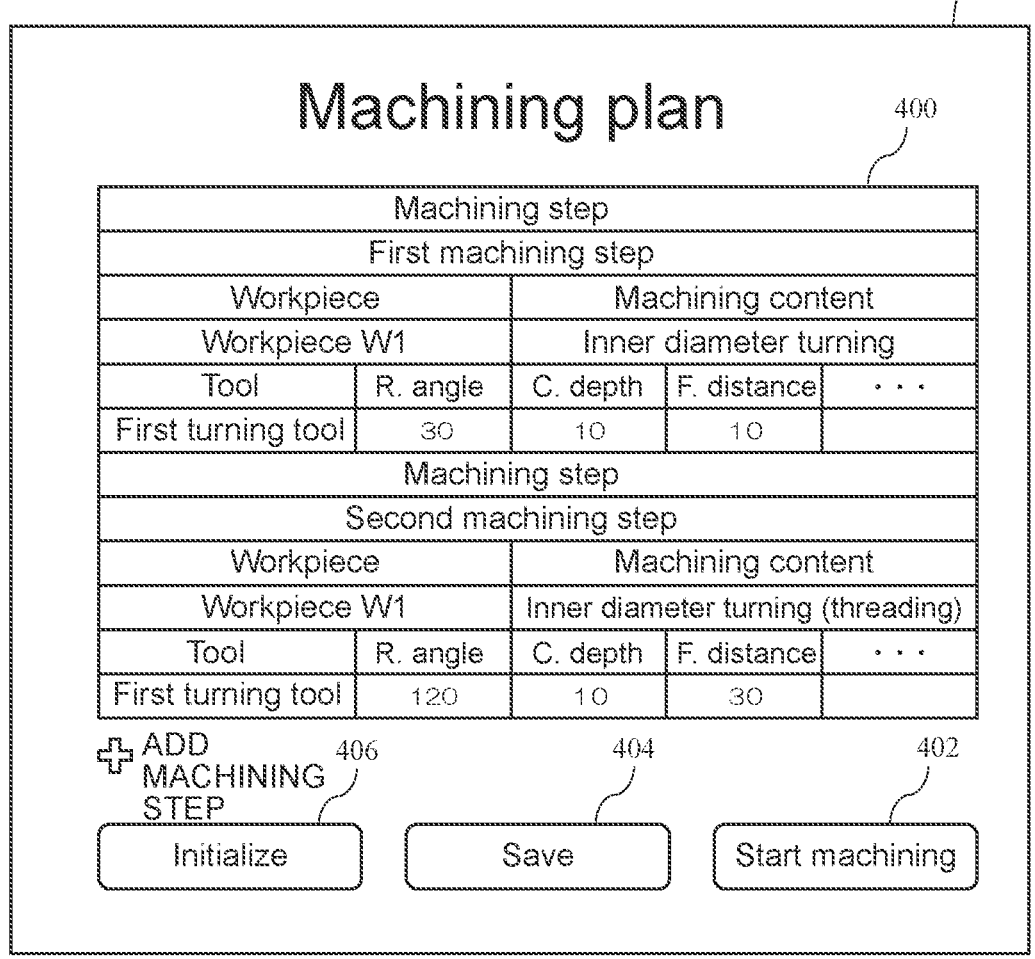
FIG. 14 illustrates an example of content displayed when a machining plan is input.
Figure 15:
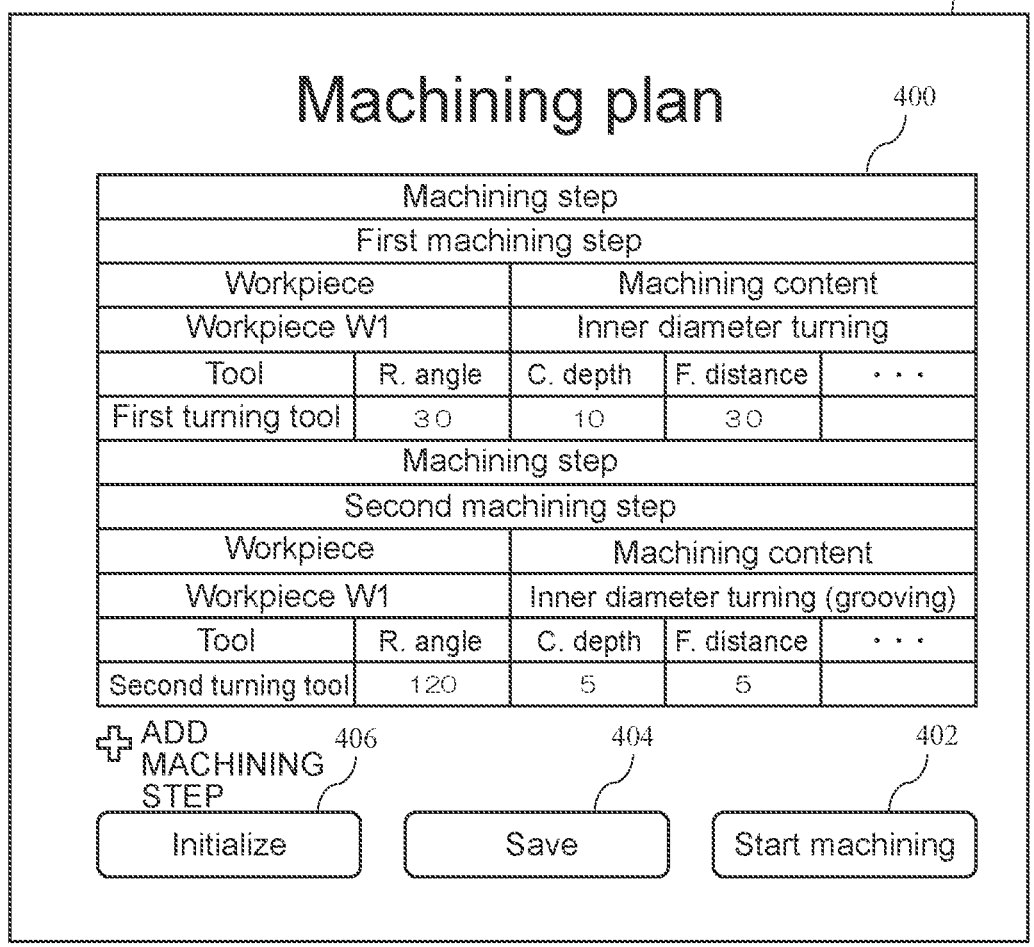
FIG. 15 illustrates an example of content displayed when a machining plan is input.
Figure 16:
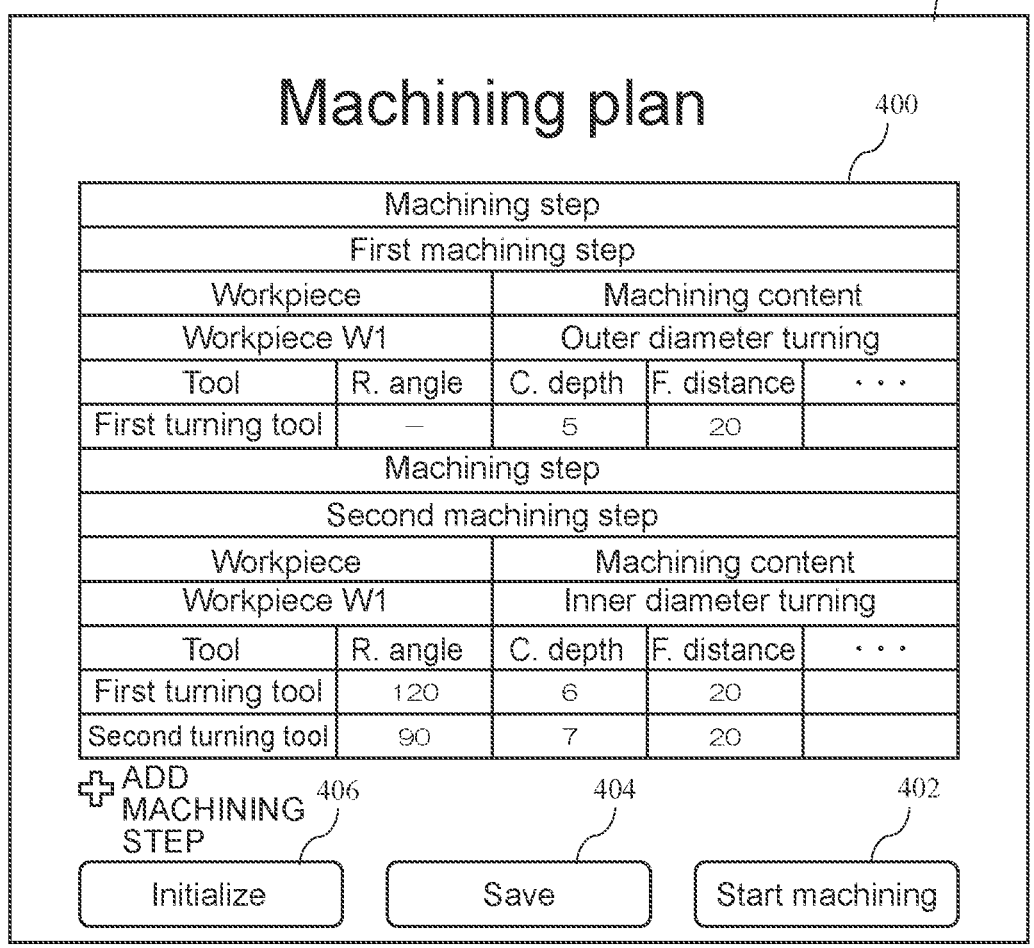
FIG. 16 illustrates an example of content displayed when a machining plan is input.

In the above-described example, no rotational angle θ was input in the first machining step. That is, the machining program 22 may not include an additional code specifying the rotational angle θ. In this case, the rotational angle θ is deemed as 0° as shown in FIGS. 10A and 10B. However, as illustrated in FIG. 14, rotational angles θ may be set in the machining steps while ensuring that the values of the rotational angles are other than 0° and different from each other. It is also to be noted that as illustrated in FIG. 15, the turning tool may vary from machining step to machining step. It is further to be noted that as illustrated in FIG. 16, a plurality of turning tools may be used in one machining step, and different rotational angles θ may be set for the plurality of turning tools.

Figure 17:
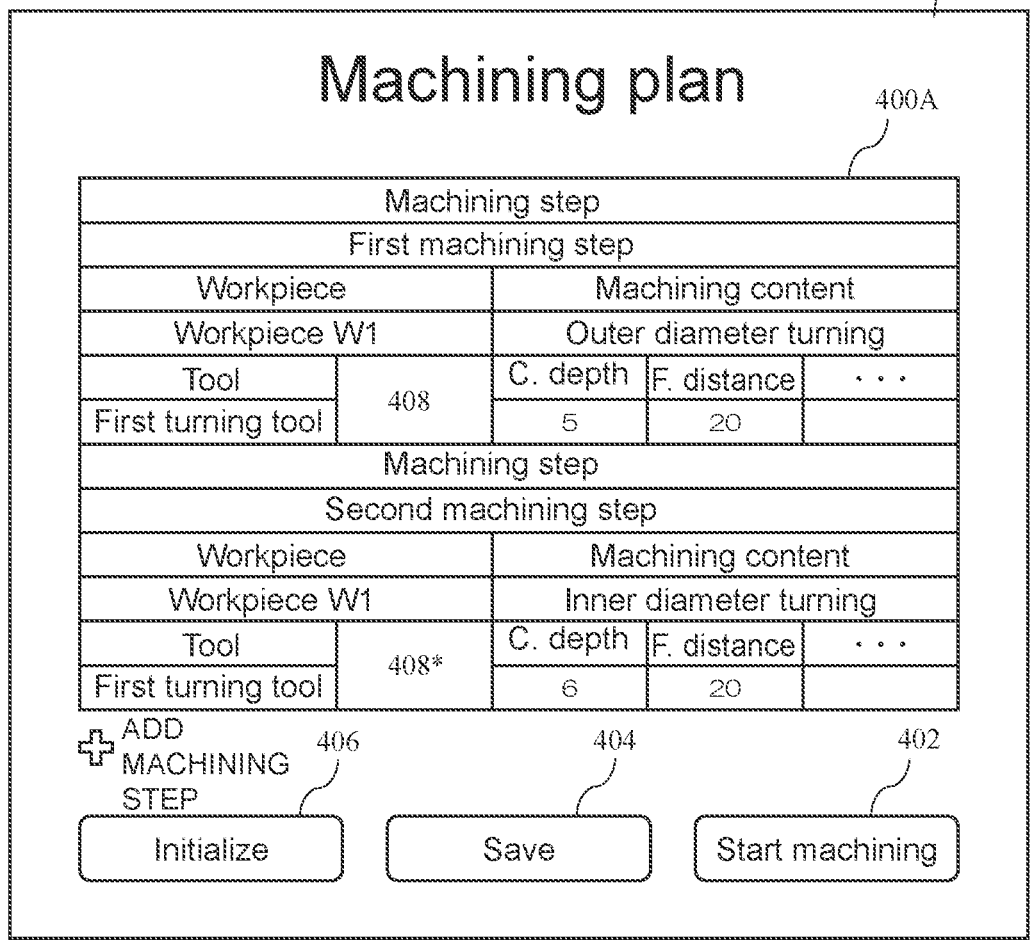
FIG. 17 illustrates an example of content displayed when a machining plan is input.
Figure 18:
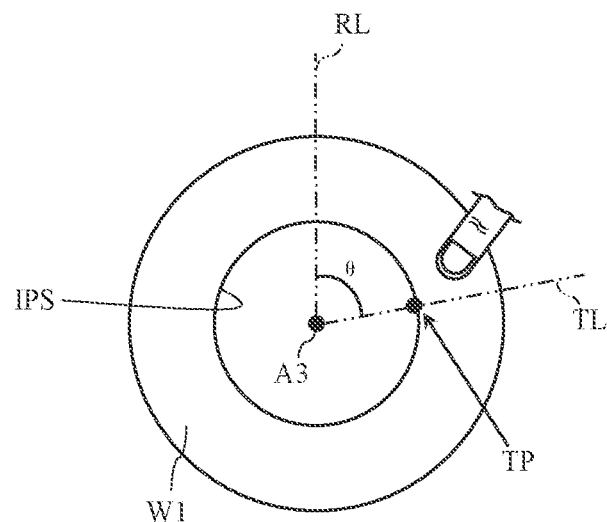
FIG. 18 illustrates an example of content displayed when a cutting target position is input.

In the above-described example, in order to rotate the blade 900E about the blade rotation axis, the rotational angle θ is input on the touch panel-equipped display 40. However, in order to rotate the blade 900E about the blade rotation axis, it is possible to input, on the touch panel-equipped display 40, a cutting target position (another example of the input value) for the cutting performed with respect to the workpiece W1. FIGS. 17 and 18 illustrate examples of content displayed when a cutting target position for the cutting performed with respect to the workpiece W1 is input.

As illustrated in FIG. 17, the processor 10 displays a plan table 400A at the time when the machining plan is determined (step S1 in FIG. 5). The plan table 400A is different from the plan table 400 illustrated in FIG. 6 in that a software key 408 is provided for each machining step. The software key 408 is displayed for setting a cutting target position. When the software key 408 has been touched, the processor 10 causes the touch panel-equipped display 40 to display a display content (an input image) illustrated in, for example, FIG. 18. When the operator has touched the cutting target position, TP, on the inner circumferential surface IPS of the workpiece W1 displayed, the processor 10 calculates the rotational angle θ between the reference line (a reference half line) RL and a target line (a target half line) TL. The target line TL passes the rotation axis A3 and passes the rotation axis A3 and the cutting target position TP. Thus, in order to change the cutting direction, the operator is able to input the cutting target position TP intuitively and easily.

In the above-described example, the processor 10 moves the first turning tool 900 for cutting and feeding control purposes. It is also possible, however, to make the workpiece W1 and the first turning tool 900 relative to each other.

Operations and Effects of this Embodiment

At the time of turning, chatter vibrations may occur depending on where the blade 900E and the workpiece W1 contact each other. The machine tool 100 according to this embodiment reduces the occurrence of chatter vibrations at the time of turning if, for example, an input value (rotational angle θ or the cutting target position TP) is input appropriately. Further, the operator may set the rotational angle θ or the cutting target position TP only in a machining step, among a plurality of machining steps, in which chatter vibrations highly possibly occur. Also, when the first turning tool 900 is rotated, visual recognizability of machining situations may improve. In this embodiment, the first turning tool 900 can be rotated on an individual machining step basis. With this configuration, the machine tool 100 provides improved visual recognizability of machining situations on an individual machining step basis.

In inner diameter turning, it is necessary to insert the blade 900E deep into the hollow portion WH1 of the workpiece W1, making it necessary to make the extension portion 902 of the first turning tool 900 long enough. As the extension portion 902 is longer, chatter vibrations are more likely to occur. For example, chatter vibrations are more likely to occur at the time of inner diameter turning, which requires the extension portion 902 to be long enough, than at the time of outer diameter turning, in which the extension portion 902 may be shorter. As in this embodiment, however, if the rotational angle θ or the cutting target position TP is input appropriately in the machining step corresponding to the inner diameter turning, the occurrence of chatter vibrations is reduced, even in the machining step corresponding to the inner diameter turning, in which chatter vibrations are more likely to occur.

Further, the machine tool 100 according to this embodiment is capable of reducing the occurrence of chatter vibrations only by rotating the tool spindle 114 about the rotation axis A2. This eliminates the need for reinforcing the column 110 and/or the tool headstock 112 in order to reduce the occurrence of chatter vibrations.

Also in inner diameter turning, when cutting is performed upward along the height direction of the machine tool 100, downward reaction force occurs from the workpiece W1 along the height direction of the machine tool 100 and acts on the first turning tool 900. This requires that the tool spindle 114, the tool headstock 112, and the column 110 have rigidity against the sum of: the reaction force occurring in the inner diameter turning; and the weight of the first turning tool 900, the tool spindle 114, and the tool headstock 112. In light of this, in this embodiment, the X axis is shifted from the height direction of the machine tool 100. This ensures that the direction in which the reaction force occurring in the inner diameter turning acts is shifted from the direction in which the weight acts. This makes the sum of the reaction force and the weight smaller, preventing such a situation that the rigidity of the tool spindle 114, the tool headstock 112, and the column 110 is insufficient.

Also, when the first turning tool 900 rotates about the rotation axis A2 while the nose 900N is located in the hollow portion WH1, it is possible for, for example, the no-blade corner position CP to contact the inner circumferential surface IPS. In this embodiment, however, at the return position IRPa, which does not overlap the workpiece W1 in the Z axis direction, the rotationally transformed three-dimensional coordinate system is returned to the pre-form three-dimensional coordinate system, and the first turning tool 900 is rotated about the rotation axis A2. This enables the machine tool 100 to prevent the first turning tool 900 from unintentionally contacting the workpiece W1.

Modifications

Figure 19:
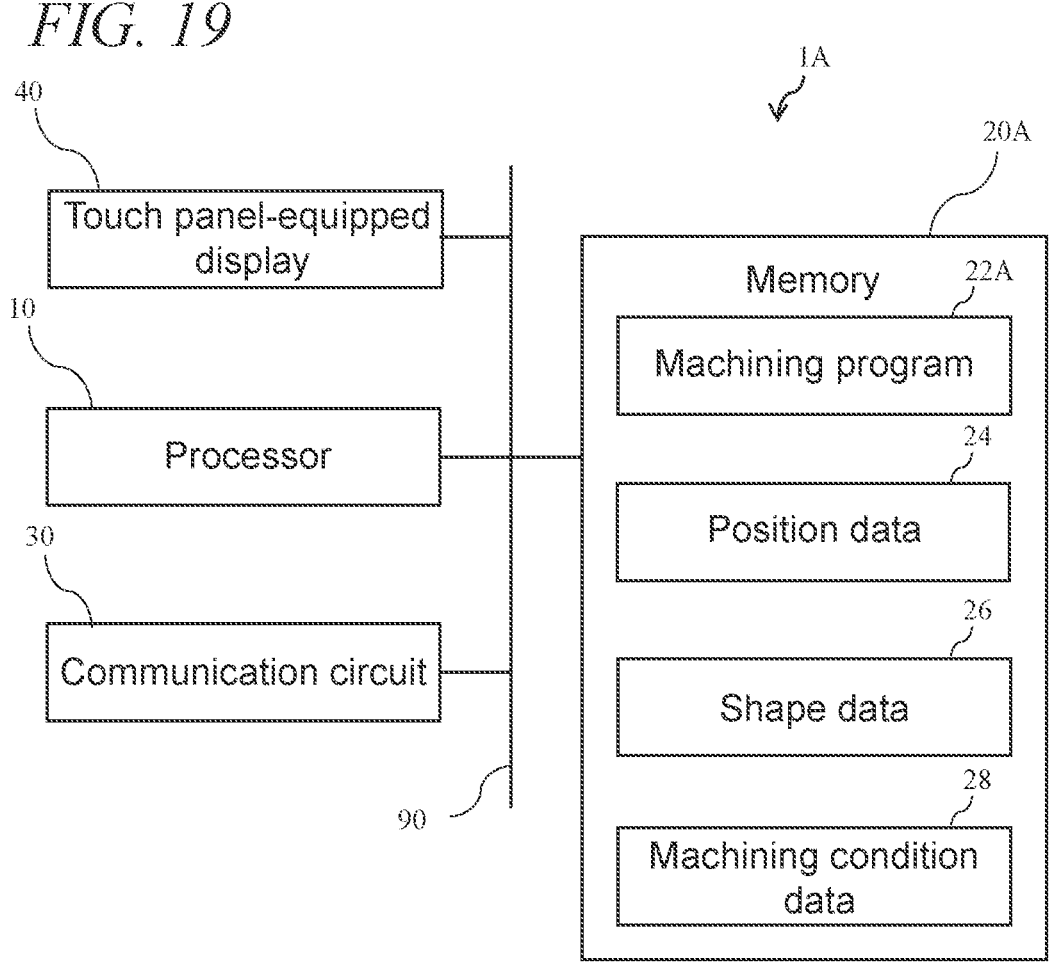
FIG. 19 is a hardware block diagram of a controller according to a modification of the controller according to the first embodiment.
Figure 21:
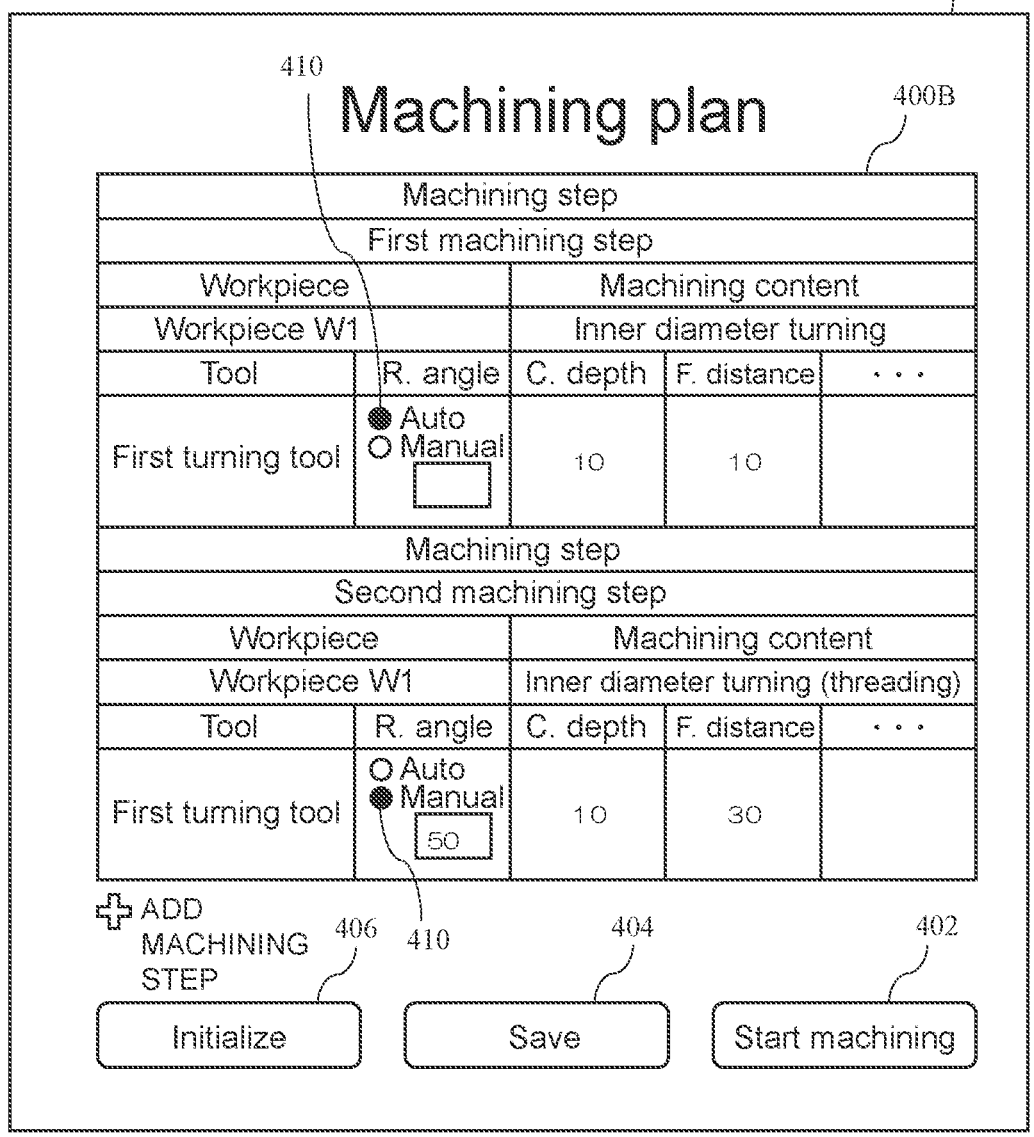
FIG. 21 illustrates an example of content displayed when a machining plan is input.

Next, a controller 1A according to a modification of the controller 1 will be described by referring to FIGS. 19, 20, and 21. FIG. 19 is a hardware block diagram of the controller 1A. FIG. 20 illustrates an example of machining condition data 28. FIG. 21 illustrates an example of content displayed when rotational angle θ is input. In this modification, the rotational angle θ is set by switching between a rotational angle input by a manipulation and a rotational angle stored in the memory 20.

As illustrated in FIG. 19, a memory 20A of the controller 1A is different from the memory 20 illustrated in FIG. 2 in that the memory 20A stores machining program 22A and the machining condition data 28. As illustrated in FIG. 20, the machining condition data 28 stores machining content, machining conditions, and rotational angle in relation to each other. While in the example illustrated in FIG. 20 a plurality of rotational angles (setting angles) are stored, a single rotational angle may be stored. The machining conditions include tool, cutting depth, and feeding distance. These values are caused to accumulate in the machining condition data 28 every time the machine tool 100 performs turning without chatter vibrations. It is to be noted that the machining condition data 28 may be data that accumulated in another machine tool. It is also to be noted that the machining condition data 28 may not necessarily be obtained by accumulation but may be input manually.

As illustrated in FIG. 21, at the time when the machining plan is identified, the processor 10 causes the touch panel-equipped display 40 to display a plan table 400B. The plan table 400B includes radio buttons 410 for each machining step. The radio buttons 410 are provided for switching between automatically setting the rotational angle θ and manually inputting the rotational angle θ. In the example illustrated in FIG. 21, the rotational angle corresponding to the first machining step is set automatically, and the rotational angle corresponding to the second machining step is input manually on the touch panel-equipped display 40.

When a selected radio button 410 indicates automatic setting of the rotational angle θ, the processor 10 refers to the machining condition data 28. Then, the processor 10 searches the machining condition data 28 for a machining condition that matches the machining condition (for example, at least one of cutting depth and feeding distance), of a machining step, that has been input on the plan table 400B. When the processor 10 has found a matching machining condition, the processor 10 reads from the machining condition data 28 a rotational angle θ corresponding to the matching machining condition, and sets the rotational angle θ that has been read as rotational angle θ for each machining step on the plan table 400B.

Thus, the controller 1A stores in the memory 20 a rotational angle θ at which the occurrence of chatter vibrations is reduced. This ensures that the occurrence of chatter vibrations is reduced more reliably. Further, the controller 1A ensures that the rotational angle θ is input more easily.

It is to be noted that as illustrated in FIG. 20, chatter vibration acceleration may be included in the machining condition data 28 in relation to machining content, machining conditions, and rotational angle. For example, the machine tool 100 includes a vibration sensor. Using the vibration sensor, the machine tool 100 detects a chatter vibration acceleration. Then, every time turning is performed, the processor 10 stores in the memory 20 the vibration acceleration in relation to the machining condition and the rotational angle. Thus, vibration acceleration is included in the machining condition data 28. This ensures that when the machining conditions input on the plan table 400B match a plurality of machining conditions of the machining condition data 28, the processor 10 sets a rotational angle θ at which the occurrence of chatter vibrations is reduced more efficiently.

It is to be noted that the controller 1A may automatically set the rotational angle for machining step. In this case, the operator is able to change, via the touch panel-equipped display 40, the rotational angle automatically set in advance.

Also in the example illustrated in FIG. 20, the rotational angle θ is included in the machining condition data 28 in relation to inner diameter turning. It is possible, however, to include the rotational angle θ in the machining condition data 28 in relation to another machining content (such as outer diameter turning).

Second Embodiment

Figure 23A:
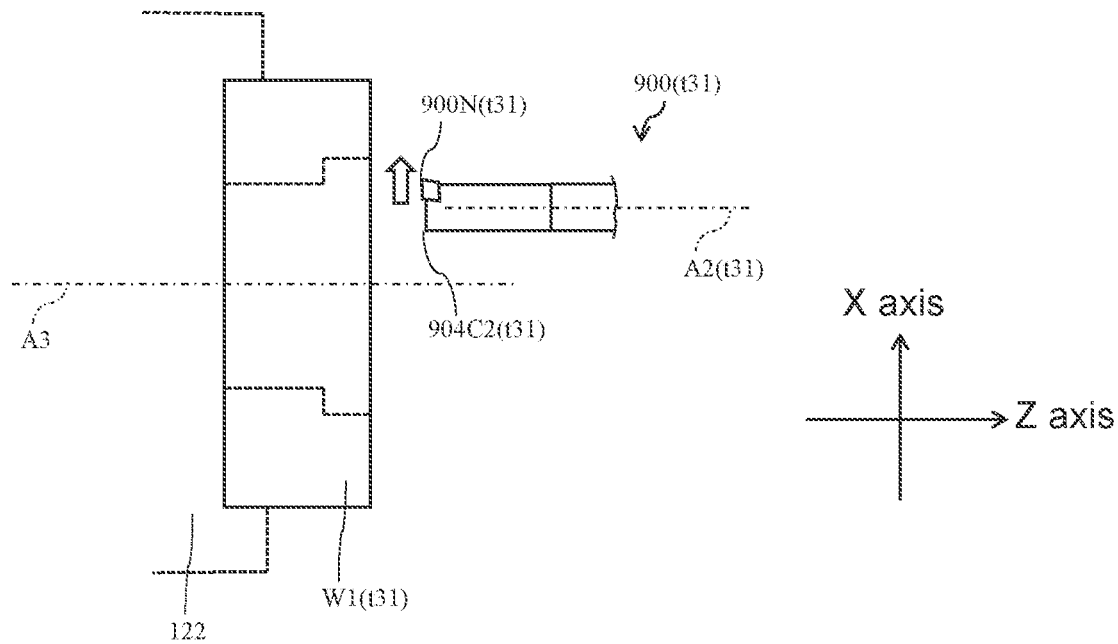
FIG. 23A illustrates inner diameter turning performed with respect to the workpiece held by a workpiece spindle.
Figure 23B:
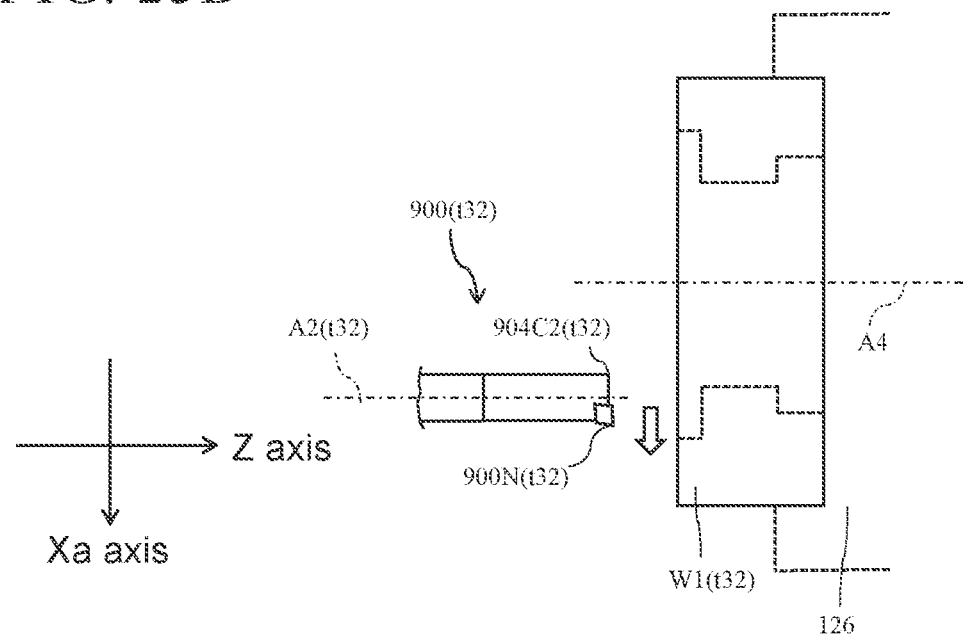
FIG. 23B illustrates inner diameter turning performed with respect to the workpiece held by another workpiece spindle.

A machine tool 100A according to the second embodiment will be described by referring to FIGS. 22, 23A, and 23B. FIG. 22 illustrates a schematic configuration of the machine tool 100A. FIG. 23A illustrates inner diameter turning performed with respect to the workpiece W1 held by the workpiece spindle 122, and FIG. 23B illustrates inner diameter turning performed with respect to the workpiece W1 held by a workpiece spindle 126.

The machine tool 100A includes a workpiece headstock 124. The workpiece headstock 124 is provided on the base 140. The workpiece headstock 124 includes the workpiece spindle 126. The workpiece headstock 124 is away from a workpiece headstock 120A in the Z axis direction in such a manner that the workpiece spindle 122 and the workpiece spindle 126 face each other in the Z axis direction. The workpiece spindle 126 is rotatable about rotation axis A4. The rotation axis A4 is substantially parallel to the rotation axis A3. The position of the rotation axis A4 in the X axis direction and the position of the rotation axis A4 in the Y axis direction are respectively identical to the position of the rotation axis A3 in the X axis direction and the position of the rotation axis A3 in the Y axis direction. The workpiece headstock 120A is movable in the Z axis direction relative to the base 140.

The machine tool 100A executes: a first machining step, which includes, with the workpiece W1 held by the workpiece spindle 122, turning with respect to the inner diameter of the workpiece W1 from one side of the Z axis direction; and a second machining step, which includes, with the workpiece W1 held by the workpiece spindle 126, turning with respect to the inner diameter of the workpiece W1 from the other side of the Z axis direction.

Specifically, as illustrated in FIG. 23A, in the first machining step, the first turning tool 900 (t31) has the nose 900N (t31) positioned above the second corner 904C2 (t31) and performs cutting with respect to the workpiece W1 (t31) held by the workpiece spindle 122. Then, the first turning tool 900 (t31) is fed, and the first machining step ends.

Then, the workpiece headstock 120A approaches the workpiece headstock 124 in the Z axis direction. It is to be noted that the workpiece headstock 124 may be movable in the Z axis direction and may approach the workpiece headstock 120A. Then, the workpiece W1 is forwarded from the workpiece spindle 122 to the workpiece spindle 126. Then, in the second machining step, the tool headstock 112 is swung about the swinging axis A1 by 180 degrees relative to the column 110. This makes the second corner 904C2 (t32) positioned above the nose 900N (t32), as illustrated in FIG. 23B. Then, the processor 10 rotates the X axis and the Y axis of the three-dimensional coordinate system about the Z axis by 180°. This eliminates the need for rotating the first turning tool 900 (t32) about the rotation axis A2 in order to make the nose 900N (t32) positioned above the second corner 904C2 (t32). Thus, it is not necessary for the machine tool 100A to rotate the tool spindle 114 about the rotation axis A2. Instead, by moving the tool spindle 114 and the workpiece spindle 126 relative to each other, the machine tool 100A rotates the blade 900E about the rotation axis A4.

The machine tool 100A reduces the occurrence of chatter vibrations in turning using the workpiece spindle 126. The machine tool 100A also increases visual recognizability of machining situations in the second machining step.

In this respect, when the tool headstock 112 swings about the swinging axis A1 by 180°, the initial rotation position of the tool spindle 114 rotates about the rotation axis A2 by 180° as well. In light of this, the reference line that serves as a basis for the direction of the extension line 900EL of the blade 900E may also rotate about the rotation axis A2 in the second machining step.

Next, a machining program 22B according to a modification of the machining program 22 will be described by referring to FIG. 24. FIG. 24 illustrates codes of the machining program 22B. The machining program 22B is an EIA/ISO program. Specifically, the machining program 22B is made up of codes in compliance with a format specified by the Electronic Industries Alliance or a format specified the International Organization for Standardization.

In the above-described example, the machining program 22 and the machining program 22A are interactive programs using the touch panel-equipped display (display screen) 40. The machining program 22B, however, is only made up of codes. It is to be noted, however, that due to highly versatile nature of the machining program 22B, the machining program 22B is executable in machine tools other than the machine tool 100 and the machine tool 100A.

In FIG. 24, items in brackets (< >) indicate that code details are omitted. As illustrated in FIG. 24, a code for performing inner diameter turning 1 as a first machining step is specified. Next, as a second machining step, T2M6 code is specified first. The T2M6 code is a code for exchanging tools. Then, G90G53B0 code is specified. The G90G53B0 is a code for swinging the tool headstock to make the workpiece rotation axis and the tool rotation axis substantially parallel to each other. Then, M19S45 code is specified. The M19S45 code is a code (an example of an additional code) for rotating the tool spindle about the tool rotation axis by a rotational angle of 45°. By executing the M19S45 code, the direction of the extension line 900EL of the blade 900E is also changed. Then, G68X0Y0Z0I0JX0K1R-45. code is specified. The G68X0Y0Z0I0JX0K1R-45. code is a code (an example of an additional code) for rotating the X axis and the Y axis of the three-dimensional coordinate system about the Z axis by the 45-degree rotational angle, thereby a cutting direction is changed to a target cutting direction from a basic cutting direction which is specified by a code for performing inner diameter turning 2. Then, as the second machining step, the code for performing inner diameter turning 2 is specified, and then G69 code is specified. The G69 code is a code for ending rotational transformation of the three-dimensional coordinate.

Further, a code for forwarding the workpiece to a different spindle is specified. Then, T3M6 code is specified. The T3M6 code is a code for exchanging the tool. Then, G90G53B180. code is specified. The G90G53B180. code is a code for swinging the tool headstock by 180°. Then, M19S225 code is specified. The M19S225 code is a code (an example of an additional code) for rotating the tool spindle about the tool rotation axis by a rotational angle of 225°. It is to be noted, however, that the rotational angle 225° is a rotational angle from the initial rotation position. Then, the G68X0Y0Z0I0JX0K1R-45. code is specified. The G68X0Y0Z0I0JX0K1R-45. code is a code (an example of an additional code) for rotating the X axis and the Y axis of the three-dimensional coordinate system about the Z axis by a rotational angle of 45°, thereby a cutting direction is changed to a target cutting direction from a basic cutting direction which is specified by a code for performing inner diameter turning 3. It is to be noted that due to the 180°-swinging of the tool headstock, there is a 180° difference between the 225° rotational angle of the tool spindle and the 45° rotational angle of the three-dimensional coordinate system. Then, as a third machining step, the code for performing inner diameter turning 3 is specified. Lastly, the G69 code is specified. The G69 code is a code for ending the rotational transformation of the three-dimensional coordinate.

Thus, the machining program 22B is in compliance with a general-purpose EIA/ISO format. Even with such machining program 22B, the occurrence of chatter vibrations at the time of turning is reduced, insofar as the rotational angle θ is approximately specified. Further, the rotational angle θ can be specified on an individual machining step basis. This ensures that the rotational angle θ may only be specified for a machining step in which chatter vibrations highly possibly occur. Also, when the turning tool is rotated, visual recognizability of machining situations may improve. The machining program 22B is capable of rotating the turning tool on an individual machining step basis, providing improved visual recognizability of machining situations on an individual machining step basis.

It is to be noted that the order in which the steps in each of the above-described flowcharts is executed may be changed insofar as machining results remain unchanged. For example, in the flowchart illustrated in FIG. 11, after the three-dimensional coordinate system has been rotationally transformed, the blade 900E is rotated about the blade rotation axis. However, the blade 900E may be rotated about the blade rotation axis first, and then the three-dimensional coordinate system may be rotationally transformed.

It is also to be noted that the machine tool that changes the rotational angle θ on an individual machining step basis will not be limited to the machine tool 100 and the machine tool 100A. Any other machine tool is possible insofar as the machine tool includes a tool spindle that rotatably holds a turning tool. For example, the machine tool that changes the rotational angle θ on an individual machining step basis may not necessarily be a multifunctional machining lathe but may be a machining center that includes a rotation table.

In the present application, the term "comprise" and its variations are intended to mean open-ended terms, not excluding any other elements and/or components that are not recited herein. The same applies to the terms "include", "have", and their variations.

Also in the present application, a component suffixed with a term such as "member", "portion", "part", "element", "body", and "structure" is intended to mean that there is a single such component or a plurality of such components.

Also in the present application, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

Also in the present application, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

Also in the present application, the phrase "at least one of A and B" is intended to be interpreted as "only A", "only B", or "both A and B".

Obviously, numerous modifications and variations of the present invention are possible in light of the above teachings. It is therefore to be understood that within the scope of the appended claims, the present invention may be practiced otherwise than as specifically described herein.

The invention claimed is:

1. A machine tool comprising:
a workpiece spindle being rotatable about a rotation axis of the workpiece spindle and configured to hold a workpiece to rotate the workpiece about the rotation axis;
a tool holding device being rotatable about a tool rotation axis and configured to hold a turning tool via which turning is performed on the workpiece;
a movement mechanism configured to move the tool holding device such that the turning tool rotates relatively to the workpiece toward a target cutting direction perpendicular to the rotation axis of the workpiece;
an input interface operable by an operator; and
control circuitry configured:
to receive an input value specifying the target cutting direction from an input by the operator through the input interface;
to execute a machining program, to perform the turning, which includes an additional code which designates the target cutting direction; and
to control the movement mechanism to move the turning tool in the target cutting direction with respect to the workpiece while the control circuitry executes the additional code.

2. The machine tool according to claim 1,
wherein the tool holding device is configured to hold the turning tool such that an orientation of the turning tool is changeable, and
wherein the control circuitry is configured to control the tool holding device such that the blade of the turning tool is directed along the target cutting direction.

3. The machine tool according to claim 1, the input interface further comprising:
a display screen to show machining steps in the machining program; and
a selection interface via which a machining step is selected from the machining steps, the input value being input in association with the machining step that is selected via the input interface value.

4. The machine tool according to claim 3, further comprising:
a tool exchanger configured to exchange the turning tool for another turning tool,
wherein the machining steps include a first machining step and a second machining step,
wherein the machining program designates the turning tool as a first turning tool and the target cutting direction as a first target cutting direction in the first machining step,
wherein the machining program designates the turning tool as a second turning tool and the target cutting direction as a second target cutting direction in the second machining step,
wherein the tool holding device holds the first turning tool in the first machining step and holds the second turning tool in the second machining step,
wherein, in the first machining step, the control circuit controls the movement mechanism such that the first turning tool moves with respect to the workpiece in the first target cutting direction, and
wherein, in the second machining step, the control circuit controls the movement mechanism such that the second turning tool moves with respect to the workpiece in the second target cutting direction.

5. The machine tool according to claim 1,
wherein a code other than the additional code in the machining program includes a cutting command to move the turning tool with respect to the workpiece in a basic cutting direction perpendicular to the rotation axis of the workpiece in a three-dimensional coordination system in which positions of the turning tool and the workpiece are defined in the machining program, and
wherein the additional code includes a parameter specifying a target angle made by the basic cutting direction and the target cutting direction.

6. The machine tool according to claim 5,
wherein the tool holding device is a tool spindle that is rotatable around a tool rotation axis,
wherein, while the control circuitry executes the additional code, the control circuitry is configured to perform position orientation conversion control comprising:
controlling the tool spindle to rotate the turning tool by the target angle about the tool rotation axis in a state that the tool rotation axis is oriented such that the tool rotation axis is substantially parallel to the rotation axis of the workpiece; and
controlling the movement mechanism to move the turning tool to a converted turning start position obtained by rotating about the rotation axis of the workpiece by the target angle, a turning start position at which the turning tool is positioned immediately before the position orientation conversion control is performed.

7. The machine tool according to claim 6, wherein the control circuitry is configured to rotationally transform the three-dimensional coordinate system about the rotation axis of the workpiece by the target angle into a converted three-dimensional coordinate system, when the control circuitry performs the position orientation conversion control.

8. The machine tool according to claim 7,
wherein the control circuitry is configured to execute the cutting command in the converted three-dimensional coordinate system to control the movement mechanism to move the turning tool in the target cutting direction with respect to the workpiece.

9. The machining tool according to claim 6,
wherein the control circuit is configured to generate a path along which the turning tool moves in the turning, the path including an initial position, a turning start position, and a turning end position of the turning tool in the three-dimensional coordination system,
wherein, when the turning tool reaches the turning start position by moving from the initial position along the path, the control circuit performs the position orientation conversion control with rotationally transforming the three-dimensional coordinate system about the rotation axis of the workpiece by the target angle into a converted three-dimensional coordinate system such that turning tool moves from the turning start position to a converted turning start position, coordinates of the turning start position in the three-dimensional coordinate system being identical to coordinates of the converted turning start position in the converted three-dimensional coordinate system,
wherein the movement mechanism is configured
to move the turning tool relative to the workpiece from the converted turning start position in a cutting direction, vector components of the cutting direction being defined in the converted three-dimensional coordinate system and identical to vector components of the basic cutting direction defined in the three-dimensional coordinate system, and
to move the turning tool to a converted turning end position whose coordinates in the converted three-dimensional coordinate system are identical to coordinates of the turning end position in the three-dimensional coordinate system.

10. The machining tool according to claim 9,
wherein the control circuit is configured to generate a return path from the converted turning end position to the initial position,
wherein the control circuit is configured to restore the converted three-dimensional coordinate system to the three-dimensional coordinate system when the turning tool reaches a return position on the return path in the converted three-dimensional coordinate system, and
wherein the return position is located outside the workpiece in an axial direction along the rotation axis of the workpiece.

11. The machining tool according to claim 5, further comprising:
a memory to store machining conditions and setting angles, the setting angles being set as the target angles in the machining conditions, respectively,
wherein the control circuitry is configured
to check that a machining condition of at least one of the machining steps matches a matched machining condition of the machining conditions stored in the memory,
to read from the memory, a matched setting angle of the setting angles, the matched setting angle corresponding to the matched machining condition, and
set the matched setting angle as the target angle in the at least one of the machining steps to set the target cutting direction in the machining program.

12. The machining tool according to claim 11,
wherein the machining condition includes at least one of a cutting depth and a feeding distance employed in the turning, and
wherein the memory is configured to store the setting angles and vibration accelerations of chatter vibrations such that the setting angles are respectively related to the vibration accelerations.

13. The machine tool according to claim 1, wherein the turning includes the machining step out of inner diameter turning, inner diameter threading, and inner diameter grooving.

14. The machine tool according to claim 1,
wherein a code other than the additional code in the machining program includes a cutting command to move the turning tool with respect to the workpiece in a basic cutting direction perpendicular to the rotation axis of the workpiece in a three-dimensional coordination system in which positions of the turning tool and the workpiece are defined in the machining program, and
wherein the input value includes a parameter specifying a target angle made by the basic cutting direction and the target cutting direction.

15. The machine tool according to claim 14,
wherein the input interface is configured to display an input image showing the workpiece, the rotation axis of the workpiece, and a reference half line corresponding to the basic cutting direction as seen along the rotation axis of the workpiece, the reference half line extending from the rotation axis of the workpiece,
wherein a cutting target position on a surface of the workpiece shown in the input image is input as the input value, and
wherein the control circuitry is configured to set the target cutting direction in the machining program by setting, as the target angle, an angle made by the reference half line and a target half line extending from the rotation axis of the workpiece and passing through the cutting target position.

16. The machine tool according to claim 1,
wherein the input interface includes a touch panel-equipped display configured to receive the input by the operator of a cutting target position as the input value, the touch panel-equipped display is configured to receive the input by the operator of the cutting target position when the operator touches the cutting target position on an image of the workpiece shown on the touch panel-equipped display.

17. A machining method for a machine tool, comprising:
mounting a workpiece to a workpiece spindle that is rotatable about a rotation axis of the workpiece;
installing in a tool holding device, a turning tool to cut the workpiece by turning, the tool holding device being mounted on a movement mechanism configured to move the tool holding device relatively to the workpiece toward a target cutting direction perpendicular to the rotation axis of the workpiece;
receiving an input value specifying the target cutting direction from an input by an operator through an input interface;
executing a machining program, to perform turning, which includes an additional code which designates the target cutting direction; and
controlling the movement mechanism to move the turning tool in the target cutting direction with respect to the workpiece while the additional code is executed.

18. A non-transitory computer-readable storage medium storing a machining program for causing a processor to perform a control method for a machine tool, the control method comprising:
controlling a movement mechanism of the machine tool to move a turning tool of the machine tool with respect to a workpiece in a cutting direction in a three-dimensional coordinate system defined in the machining program, the cutting direction being identical to a basic cutting direction;
receiving an input value specifying a target cutting direction from an input by an operator through an input interface; and
changing the cutting direction from the basic cutting direction to the target cutting direction based on a target angle made by the basic cutting direction and the target cutting direction, the target angle being specified in an additional code in the machining program.

19. The non-transitory computer-readable storage medium according to claim 18, the control method further comprising:

rotating a tool holding device of the machining tool such that a tool rotation axis of the tool holding device is substantially parallel to the rotation axis of the workpiece, the tool holding device rotatably holding the turning tool around the tool rotation axis, wherein the changing the cutting direction from the basic cutting direction to the target cutting direction comprises controlling the tool holding device to rotate the turning tool by the target angle around the tool rotation axis.

20. The non-transitory computer-readable storage medium according to claim 19, wherein the changing the cutting direction from the basic cutting direction to the target cutting direction further comprises:

rotationally transforming the three-dimensional coordination system by the target angle around the rotation axis of the workpiece into a converted three-dimensional coordination system, and controlling the movement mechanism to move the turning tool to a converted turning start position obtained by rotating a turning start position about the rotation axis of the workpiece by the target angle such that coordinates of the converted turning start position in the converted three-dimensional coordination system are identical to coordinates of the turning start direction in the three-dimensional coordination system.

\* \* \* \* \*